(12) United States Patent
Sugaya

(10) Patent No.: US 11,357,049 B2
(45) Date of Patent: Jun. 7, 2022

(54) COMMUNICATION APPARATUS

(71) Applicant: SONY CORPORATION, Tokyo (JP)

(72) Inventor: Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/964,891

(22) PCT Filed: Jan. 25, 2019

(86) PCT No.: PCT/JP2019/002402
§ 371 (c)(1),
(2) Date: Jul. 24, 2020

(87) PCT Pub. No.: WO2019/155907
PCT Pub. Date: Aug. 15, 2019

(65) Prior Publication Data
US 2021/0037570 A1    Feb. 4, 2021

(30) Foreign Application Priority Data

Feb. 9, 2018  (JP) .............................. JP2018-021661

(51) Int. Cl.
*H04W 4/00*    (2018.01)
*H04W 74/08*   (2009.01)
(Continued)

(52) U.S. Cl.
CPC ......... *H04W 74/0816* (2013.01); *H04L 69/22* (2013.01); *H04W 52/245* (2013.01); *H04W 84/12* (2013.01)

(58) Field of Classification Search
CPC ........... H04W 74/0816; H04W 52/245; H04W 84/12; H04W 52/246; H04W 74/0808;
(Continued)

(56) References Cited

U.S. PATENT DOCUMENTS

2005/0105504 A1\* 5/2005 Sakoda ................. H04L 1/1607
370/349
2006/0268924 A1\* 11/2006 Marinier ............. H04W 52/242
370/445
(Continued)

FOREIGN PATENT DOCUMENTS

CN    1698315 A    11/2005
CN   101385283 A    3/2009
(Continued)

OTHER PUBLICATIONS

Extended European Search Report of EP Application No. 19751966.3, dated Mar. 1, 2021, 10 pages.
(Continued)

*Primary Examiner* — Amancio Gonzalez
(74) *Attorney, Agent, or Firm* — Chip Law Group

(57) ABSTRACT

The present technology relates to a communication apparatus that can notify surrounding apparatuses of the presence of the apparatus that is receiving data.
A wireless transmission processing section of a communication apparatus serving as a data frame transmitting side transmits, under control of a transmission timing control section, a data frame to a destination communication apparatus so as to include intermittent transmission-suspension periods. The present disclosure can be applied to, for example, a wireless LAN system.

18 Claims, 26 Drawing Sheets

(51) Int. Cl.
*H04L 69/22* (2022.01)
*H04W 52/24* (2009.01)
*H04W 84/12* (2009.01)

(58) Field of Classification Search
CPC .... H04W 74/002; H04W 28/06; H04L 69/22; H04L 47/28
USPC .................. 370/318, 310.2, 329; 455/550.1
See application file for complete search history.

(56) References Cited

U.S. PATENT DOCUMENTS

| | | | | |
|---|---|---|---|---|
| 2007/0206628 | A1* | 9/2007 | Nishio | H04B 7/15528 370/445 |
| 2009/0109936 | A1* | 4/2009 | Nagai | H04W 74/0808 370/336 |
| 2010/0316100 | A1 | 12/2010 | Snauwaert | |
| 2012/0282932 | A1* | 11/2012 | Yu | H04W 84/005 455/437 |
| 2015/0085775 | A1* | 3/2015 | Choi | H04W 74/002 370/329 |
| 2015/0351125 | A1 | 12/2015 | Kwon et al. | |
| 2016/0198364 | A1* | 7/2016 | Schwarzbauer | H04W 28/08 370/331 |
| 2016/0360541 | A1 | 12/2016 | Kim et al. | |
| 2018/0263047 | A1 | 9/2018 | Kim et al. | |
| 2018/0310340 | A1* | 10/2018 | Noh | H04L 27/26 |
| 2020/0067661 | A1* | 2/2020 | Siomina | H04L 5/10 |
| 2020/0244333 | A1* | 7/2020 | Ui | H04W 24/04 |
| 2020/0329530 | A1* | 10/2020 | Holmberg | G06F 3/0655 |

FOREIGN PATENT DOCUMENTS

| | | |
|---|---|---|
| CN | 106063152 A | 10/2016 |
| EP | 1592175 A1 | 11/2005 |
| EP | 1821462 A1 | 8/2007 |
| EP | 1987631 A1 | 11/2008 |
| EP | 3131215 A1 | 2/2017 |
| JP | 2010-124490 A | 6/2010 |
| JP | 2011-254319 A | 12/2011 |
| JP | 4971366 B2 | 7/2012 |
| JP | 2015-061138 A | 3/2015 |
| JP | 2017-508423 A | 3/2017 |
| JP | 6616464 B2 | 12/2019 |
| KR | 10-2005-0096840 A | 10/2005 |
| KR | 10-2008-0102364 A | 11/2008 |
| KR | 10-2014-0006720 A | 1/2014 |
| KR | 10-2016-0115910 A | 10/2016 |
| WO | 2007/096254 A1 | 8/2007 |
| WO | 2015/122630 A1 | 8/2015 |
| WO | 2016/104886 A1 | 6/2016 |

OTHER PUBLICATIONS

Monks, et al., "A Power Controlled Multiple Access Protocol for Wireless Packet Networks", Proceedings IEEE INFOCOM 2001. Conference on Computer Communications. Twentieth Annual Joint Conference of the IEEE Computer and Communications Society (Cat. No. 01 CH37213 [Proceedings IEEE INFOCOM. The Conference on Computer Communications], PISCAT, vol. 1, Apr. 22, 2001, 10 pages.

International Search Report and Written Opinion of PCT Application No. PCT/JP2019/002402, dated Apr. 2, 2019, 07 pages of ISRWO.

* cited by examiner

FIG.12

| Using Signal | | | |
|---|---|---|---|
| L-STF | L-LTF | L-SIG | Using Signal Parameter |

FIG.13

| End Signal | | |
|---|---|---|
| L-STF | L-LTF | L-SIG |

| Modulation | Coding rate (R) | Coded bits per subcarrier ($N_{BPSC}$) | Coded bits per OFDM symbol ($N_{CBPS}$) | Data bits per OFDM symbol ($N_{DBPS}$) | Data rate (Mb/s) (20 MHz channel spacing) | Data rate (Mb/s) (10 MHz channel spacing) | Data rate (Mb/s) (5 MHz channel spacing) |
|---|---|---|---|---|---|---|---|
| BPSK | 1/2 | 1 | 48 | 24 | 6 | 3 | 1.5 |
| BPSK | 3/4 | 1 | 48 | 36 | 9 | 4.5 | 2.25 |
| QPSK | 1/2 | 2 | 96 | 48 | 12 | 6 | 3 |
| QPSK | 3/4 | 2 | 96 | 72 | 18 | 9 | 4.5 |
| 16-QAM | 1/2 | 4 | 192 | 96 | 24 | 12 | 6 |
| 16-QAM | 3/4 | 4 | 192 | 144 | 36 | 18 | 9 |
| 64-QAM | 2/3 | 6 | 288 | 192 | 48 | 24 | 12 |
| 64-QAM | 3/4 | 6 | 288 | 216 | 54 | 27 | 13.5 |

COMMUNICATION APPARATUS

CROSS REFERENCE TO RELATED APPLICATIONS

This application is a U.S. National Phase of International Patent Application No. PCT/JP2019/002402 filed on Jan. 25, 2019, which claims priority benefit of Japanese Patent Application No. JP 2018-021661 filed in the Japan Patent Office on Feb. 9, 2018. Each of the above-referenced applications is hereby incorporated herein by reference in its entirety.

TECHNICAL FIELD

The present technology relates to a communication apparatus, and particularly, to a communication apparatus that can notify surrounding apparatuses of the presence of the apparatus that is receiving data.

BACKGROUND ART

Conventionally, in a wireless LAN system, control has been performed in such a way that in a case where a surrounding communication apparatus recognizes that a transmission path is in use, the surrounding communication apparatus refrains from transmission by setting a network allocation vector (NAV) on the basis of a value described in a Duration portion of a MAC header.

With a communication scheme using the NAV, a surrounding communication apparatus that has received a Request to Send (RTS) frame from a communication apparatus serving as a data transmitting side and a Clear to Send (CTS) frame from a communication apparatus serving as a data receiving side recognizes that a transmission path is in use over a period of time described in the Duration portion of the MAC header.

Conventionally, moreover, a method of transmitting a busy tone signal from an access point has been generally used as a method to communicate that a transmission path is in use.

The method using the busy tone signal transmits the busy tone signal in an environment, for example, where a plurality of access points is adjacent to each other. This prevents communication failure in its own access point due to a signal received from a wireless communication terminal in a surrounding access point.

PTL 1 discloses a technology, by which in an environment where a plurality of access points is adjacent to each other, an access point using a transmission path transmits a busy tone signal using a predetermined tone channel. This allows the access point to communicate to another access point that the transmission path is in use.

CITATION LIST

Patent Literature

[PTL 1]
Japanese Patent Laid-open No. 2011-254319

SUMMARY

Technical Problems

With the conventional NAV setting method, the NAV is set in both of cases where the RTS frame is received and where the CTS frame is received. Therefore, in some cases, this method suppresses transmission from a range that does not affect reception of a data frame by a communication apparatus serving as the receiving side.

Further, with the conventional method using the busy tone signal, a communication apparatus needs to be provided with a communication block for transmitting and receiving the busy tone signal.

The present technology has been made in view of such a situation and enables surrounding apparatuses to be notified of the presence of an apparatus that is receiving data.

Solution to Problems

A communication apparatus according to a first aspect of the present technology includes: a construction section configured to generate a data frame; a transmission section configured to transmit the data frame to a destination communication apparatus; and a control section configured to, during the transmission of the data frame, perform control to suspend the transmission for a predetermined period of time.

A communication apparatus according to a second aspect of the present technology includes: a reception section configured to receive a data frame transmitted so as to include intermittent transmission-suspension periods; and a transmission section configured to transmit a using signal during each of the transmission-suspension periods, the using signal indicating that a transmission path is in use.

A communication apparatus according to a third aspect of the present technology includes: a reception section configured to receive a using signal transmitted to a first communication apparatus from a second communication apparatus, the using signal indicating that a transmission path is in use, the first communication apparatus being configured to transmit a data frame transmitted so as to include intermittent transmission-suspension periods, the second communication apparatus being configured to receive the data frame, the using signal being transmitted during each of the transmission-suspension periods; and a transmission control section configured to control transmission according to a reception status of the using signal.

According to the first aspect of the present technology, a data frame is generated and the data frame is transmitted to a destination communication apparatus. During the transmission of the data frame, control is performed to suspend the transmission for a predetermined period of time.

According to the second aspect of the present technology, a data frame transmitted so as to include intermittent transmission-suspension periods is received. A using signal is transmitted during each of the transmission-suspension periods. The using signal indicates that a transmission path is in use.

According to the third aspect of the present technology, a using signal transmitted to a first communication apparatus from a second communication apparatus is received. The using signal indicates that a transmission path is in use. The first communication apparatus is configured to transmit a data frame transmitted so as to include intermittent transmission-suspension periods. The second communication apparatus is configured to receive the data frame. The using signal is transmitted during each of the transmission-suspension periods. Further, transmission is controlled according to a reception status of the using signal.

Advantageous Effects of Invention

According to the present technology, surrounding apparatuses can be notified of the presence of an apparatus that is receiving data.

It is noted that the effects described in the present specification are merely examples. The effects of the present technology are not limited to the effects described in the present specification and there may be additional effects.

BRIEF DESCRIPTION OF DRAWINGS

FIG. 12 is a diagram illustrating an example of a configuration of a using signal frame.

FIG. 13 is a diagram illustrating an example of a configuration of an End Signal frame.

FIG. 14 is a diagram illustrating an example of the data arrangement of an L-SIG and a Using Signal parameter.

FIG. 16 is a diagram illustrating relationships between modulation schemes and coding rates.

DESCRIPTION OF EMBODIMENT

Hereinafter, a mode for carrying out the present disclosure (hereinafter referred to as an embodiment) will be described.

<Example of Configurations of Wireless Networks>

Figure 1:
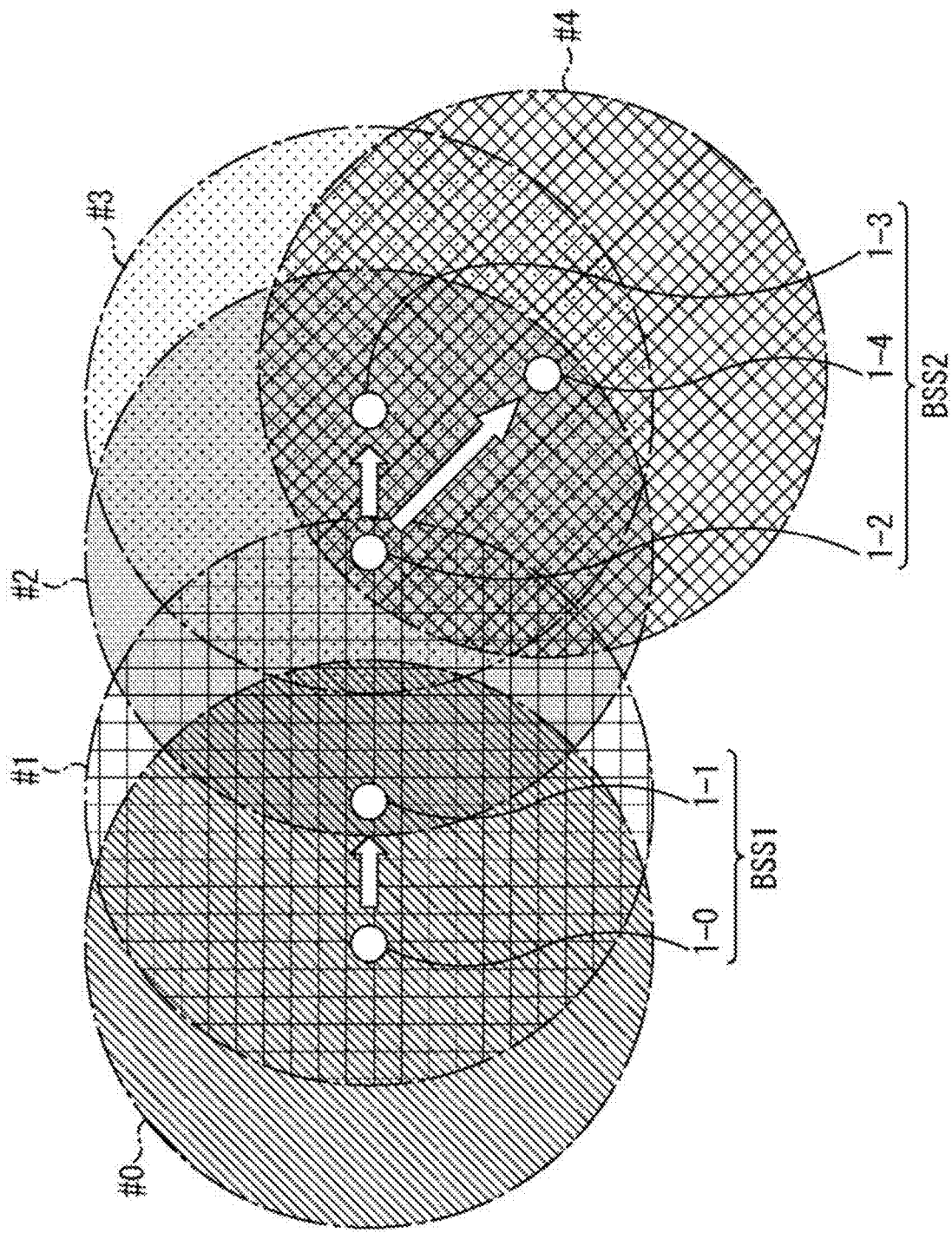
FIG. 1 is a diagram illustrating an example of configurations of wireless networks in a wireless LAN system.

FIG. 1 is a diagram illustrating an example of configurations of wireless networks in a wireless LAN system.

In the wireless LAN system in FIG. 1, communication apparatuses 1-0 to 1-4 operate in the same frequency channel. Hereinafter, in a case where the communication apparatuses 1-0 to 1-4 do not need to be distinguished from each other, the communication apparatuses 1-0 to 1-4 will be referred to as a communication apparatus 1.

The wireless LAN system in FIG. 1 includes a first basic service set (BSS1) and a second basic service set (BSS2) that are connected as wireless networks. While the BSS1 and the BSS2 are present as different wireless networks, the BSS1 and the BSS2 are BSSs that are configured using the same frequency channel and present in a partially overlapping space.

A BSS is a wireless network group. For example, a BSS is a wireless network group at a person A's house or a wireless network group at a person B's house. The group to which its communication apparatuses belong is restricted by a password or the like.

The BSS1 includes the communication apparatus 1-0 and the communication apparatus 1-1. The BSS2 includes the communication apparatus 1-2, the communication apparatus 1-3, and the communication apparatus 1-4.

Circles #0 to #4 indicated by dashed-dotted lines schematically represent radio-wave ranges of the communication apparatuses 1-0 to 1-4, respectively, in a case where no transmit power control is performed. The sizes of the respective circles #0 to #4 are the same. This indicates that since no transmit power control is performed, transmission is performed with a maximum transmit power. Each white arrow indicates a direction in which data is transmitted. These are similarly applied to FIG. 2 and subsequent figures.

In the example in FIG. 1, the communication apparatus 1-0 is transmitting data in the BSS1, while the communication apparatus 1-2 is transmitting data in the BSS2. Further, the communication apparatus 1-1 is within the radio-wave range of the communication apparatus 1-2 in the BSS2. With this configuration, the communication apparatus 1-1 in the BSS1 detects a signal transmitted by the communication apparatus 1-2 in the BSS2.

Figure 2:
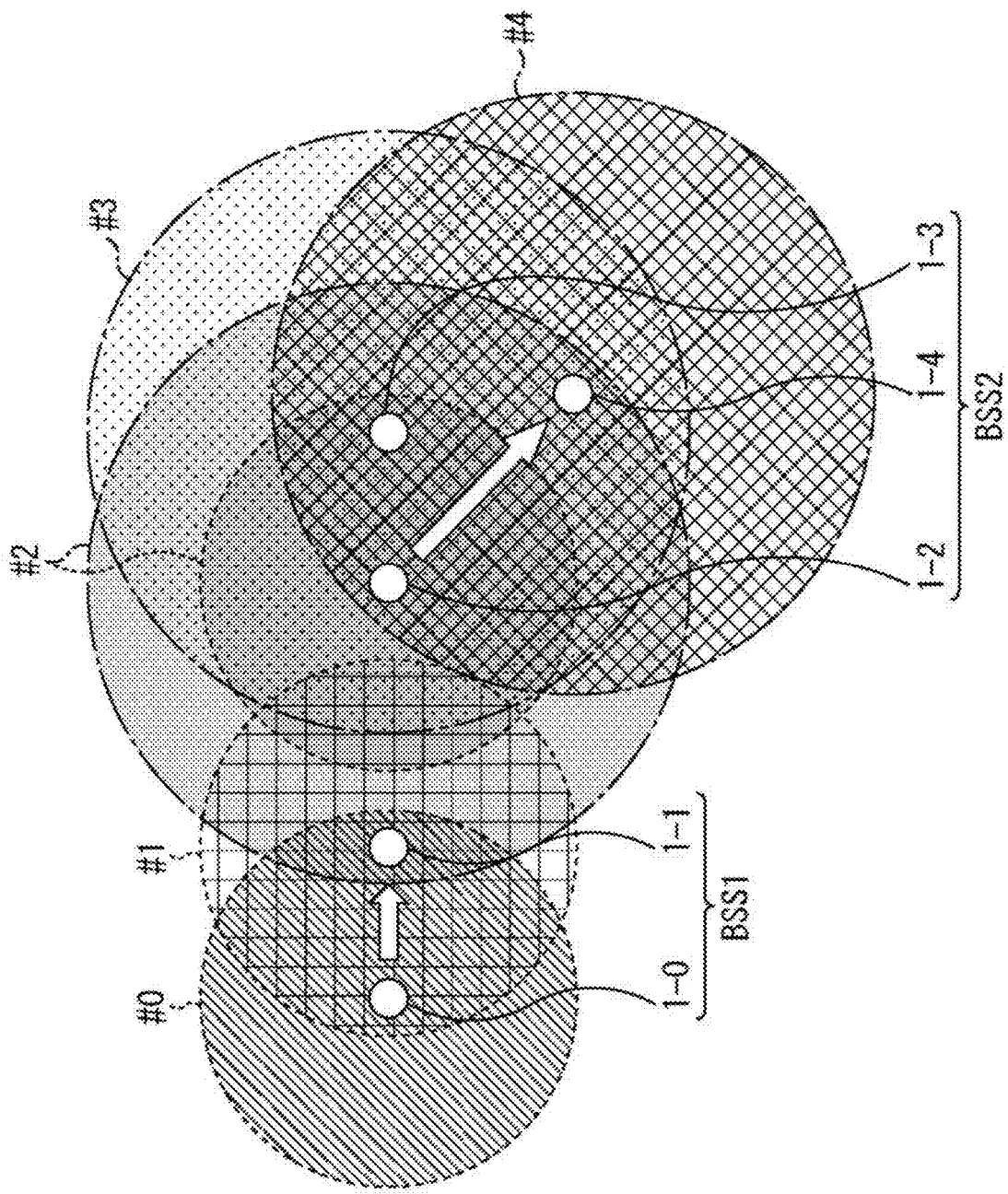
FIG. 2 is a diagram illustrating a situation where interference occurs in the wireless networks in a case where transmit power control is performed.

FIG. 2 is a diagram illustrating a situation where interference occurs in the wireless networks in a case where transmit power control is performed.

A circle #0 and a circle #1 indicated by dashed lines schematically represent the radio-wave ranges of the communication apparatus 1-0 and the communication apparatus 1-1, respectively. The circle #0 and the circle #1 are smaller than those in FIG. 1. This indicates that the communication apparatus 1-0 and the communication apparatus 1-1 are performing transmit power control. It is noted that a circle #2 indicated by a dashed line is illustrated just for reference. In FIG. 2, since the communication apparatus 1-2 is not performing transmit power control, a circle #2 indicated by a dashed-dotted line represents the radio-wave range of the communication apparatus 1-2.

In the example in FIG. 2, both the communication apparatus 1-0 and the communication apparatus 1-1 in the BSS1 are performing transmit power control to communicate with each other. In a communication scheme using an NAV, the communication apparatus 1-0 transmits an RTS frame and the communication apparatus 1-1 transmits a CTS frame. Thus, if the surrounding communication apparatus 1-2 receives one of the RTS frame and the CTS frame, the surrounding communication apparatus 1-2 is able to know that the communication apparatus 1-0 and the communication apparatus 1-1 are performing transmission and reception.

However, the communication apparatus 1-2 in the BSS2 is not within the radio-wave range of the communication apparatus 1-1 in the BSS1. Therefore, it is not possible for the communication apparatus 1-2 in the BSS2 to recognize that the communication apparatus 1-1 is receiving data transmitted from the communication apparatus 1-0 in the BSS1 to the communication apparatus 1-1.

In this case, there is a possibility that the communication apparatus 1-2 determines that a transmission path is available, and therefore transmits data to the communication apparatus 1-4 without performing transmit power control. The communication apparatus 1-1 receiving the data transmitted from the communication apparatus 1-0 receives the data in a such a way that overlaps with the data transmitted to the communication apparatus 1-4 from the communication apparatus 1-2. Therefore, there is a risk that an error occurs when the communication apparatus 1-1 receives the data transmitted from the communication apparatus 1-0, and the communication apparatus 1-1 cannot decode the data correctly.

Figure 3:
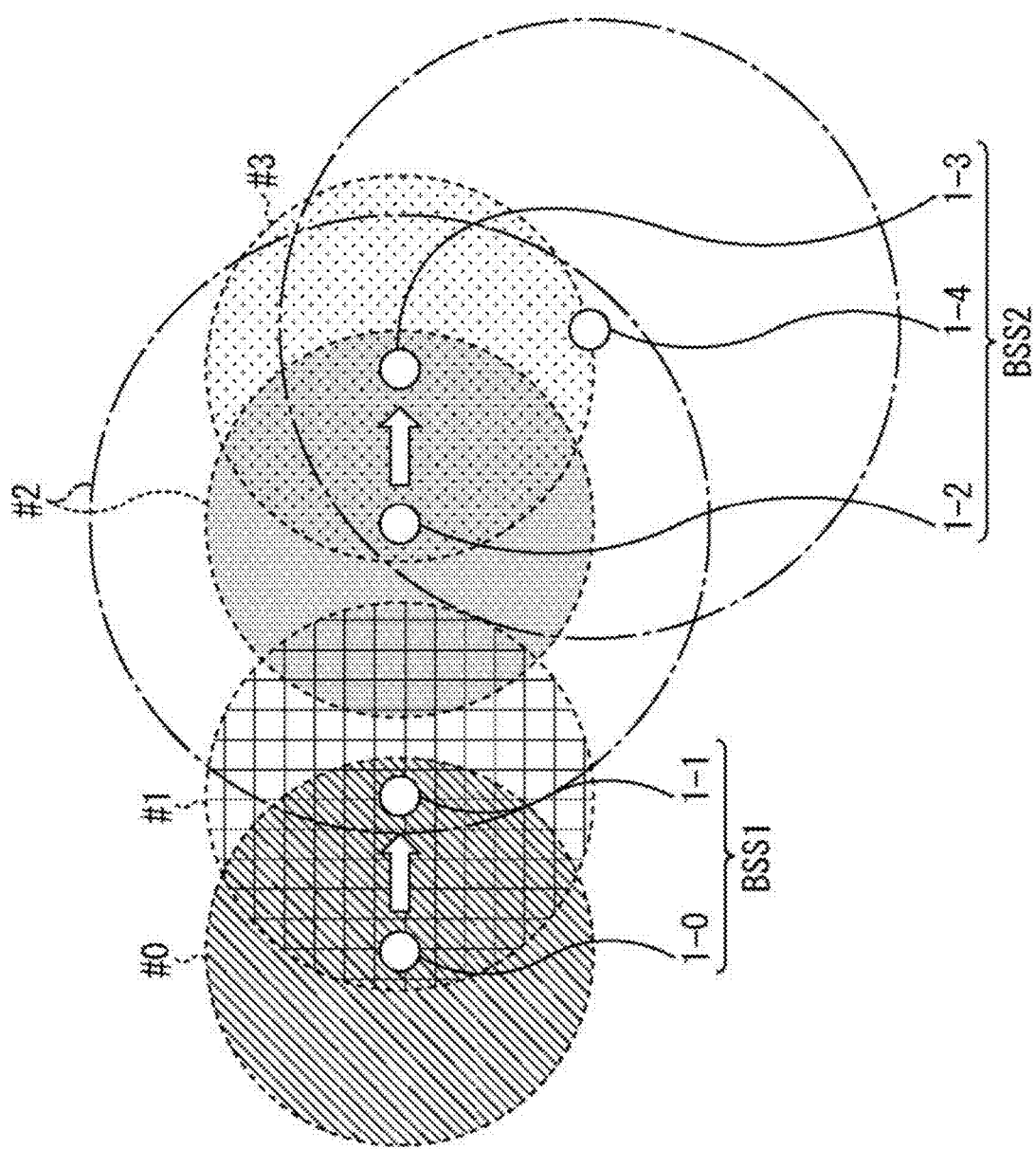
FIG. 3 is a diagram illustrating a problem of the wireless networks in a case where transmit power control is performed.

FIG. 3 is a diagram illustrating a problem of the wireless networks in a case where transmit power control is performed.

A circle #2 and a circle #3 indicated by dashed lines schematically represent the radio-wave ranges of the communication apparatus 1-2 and the communication apparatus 1-3, respectively. The circle #2 and the circle #3 are smaller than those in FIG. 1. This indicates that the communication apparatus 1-2 and the communication apparatus 1-3 are performing transmit power control.

In the example in FIG. 3, both the communication apparatus 1-0 and the communication apparatus 1-1 in the BSS1 are performing transmit power control to communicate with each other, while both the communication apparatus 1-2 and the communication apparatus 1-3 in the BSS2 are performing transmit power control to communicate with each other with a suppressed transmit power. The communication apparatus 1-4 in the BSS2 is not within the radio-wave range of the communication apparatus 1-2.

In this case, in some cases, the communication apparatus 1-4 may have difficulty in detecting a signal transmitted from the communication apparatus 1-2. This configuration, therefore, hinders the data transmission and reception in the BSS2.

Thus, performing a similar level of transmit power control in adjacent different BSSs hinders communication with a communication apparatus that is supposed to be within a network configurable range. Therefore, communication needs to be performed with a maximum transmit power without controlling transmit power.

Figure 4:
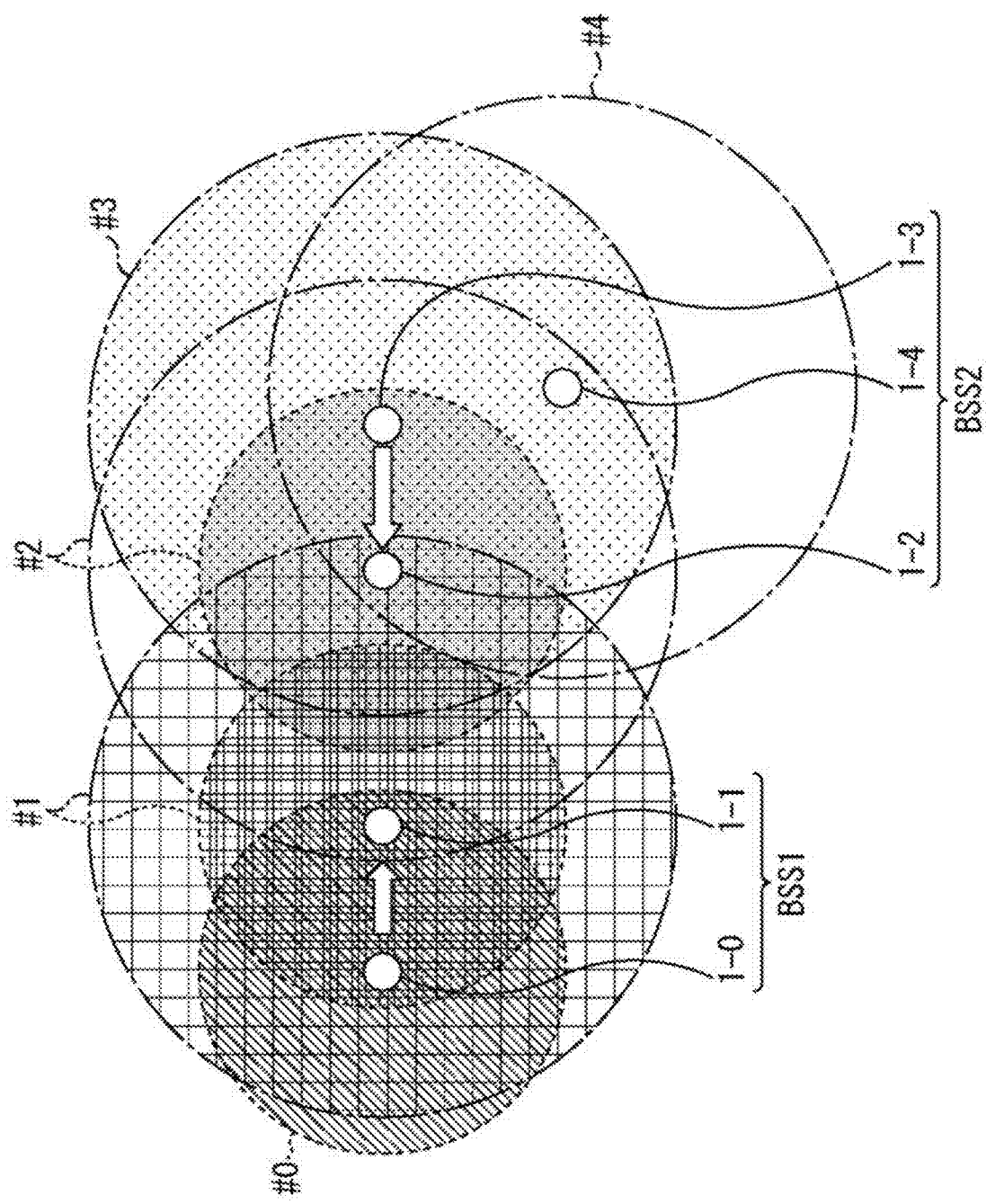
FIG. 4 is a diagram illustrating an example of operations of surrounding communication apparatuses in a case where a receiving side transmits a CTS frame.

FIG. 4 is a diagram illustrating an example of operations of surrounding communication apparatuses in a case where a data receiving side transmits a CTS frame with a maximum transmit power.

A circle #0 indicated by a dashed line schematically represents the radio-wave range of the communication apparatus 1-0. The circle #0 is smaller than that in FIG. 1. This indicates that the communication apparatus 1-0 is performing transmit power control to perform data communication. It is noted that a circle #1 and a circle #2 indicated by dashed lines are illustrated just for reference. In FIG. 4, since the communication apparatus 1-1 and the communication apparatus 1-2 are not performing transmit power control, a circle #1 and a circle #2 indicated by dashed-dotted lines represent the radio-wave ranges of the communication apparatus 1-1 and the communication apparatus 1-2, respectively.

In the example in FIG. 4, the communication apparatus 1-1 transmits a CTS frame with a maximum transmit power as a receiving operation. The CTS frame transmitted from the communication apparatus 1-1 is received by the communication apparatus 1-2 in the surrounding BSS2, and the NAV is set in the communication apparatus 1-2.

In this case, although the communication apparatus 1-2 can receive a signal transmitted from the communication apparatus 1-3, the communication apparatus 1-2 cannot transmit a frame such as, for example, an ACK, which indicates the completion of the reception, to the communication apparatus 1-3 since the NAV is set therein.

In this manner, transmitting the CTS frame is one method as the operation of the communication apparatus 1-1 to perform reception and notify the surroundings. However, this CTS frame transmission method does not sufficiently cope with cases where transmit power control is performed.

In this manner, with the NAV setting method according to the conventional technology, the NAV is set in both of the cases where an RTS signal is received and where a CTS signal is received. This method, therefore, has suppressed transmission from a range that does not affect reception of data by the communication apparatus 1 serving as the receiving side.

Therefore, there is a need for a technology using a method other than the CTS frame, by which the surrounding communication apparatuses 1 are notified that the transmission path is being used by the communication apparatus 1 receiving a signal transmitted under transmit power control.

In view of the foregoing, in the present technology, the transmitting side transmits a data frame so as to include intermittent transmission-suspension periods. Further, while the receiving side receives the data frame, the receiving side transmits a using signal (Using Signal) in each of the transmission-suspension periods.

The communication apparatus 1 serving as the receiving side that has received the data frame transmits the using signal during each of the intermittently set periods. With this configuration, any surrounding communication apparatus 1 that has received the using signal is able to recognize that the transmission path is in use even if the communication apparatus 1 has not received the data frame. Here, the surrounding communication apparatus 1 refers to any communication apparatus 1 that is other than the communication apparatus 1 transmitting the data frame and the communication apparatus 1 transmitting the using signal and that is present in the vicinity of the latter communication apparatus 1.

<Example of Configuration of Wireless LAN System According to Present Technology>

Figure 5:
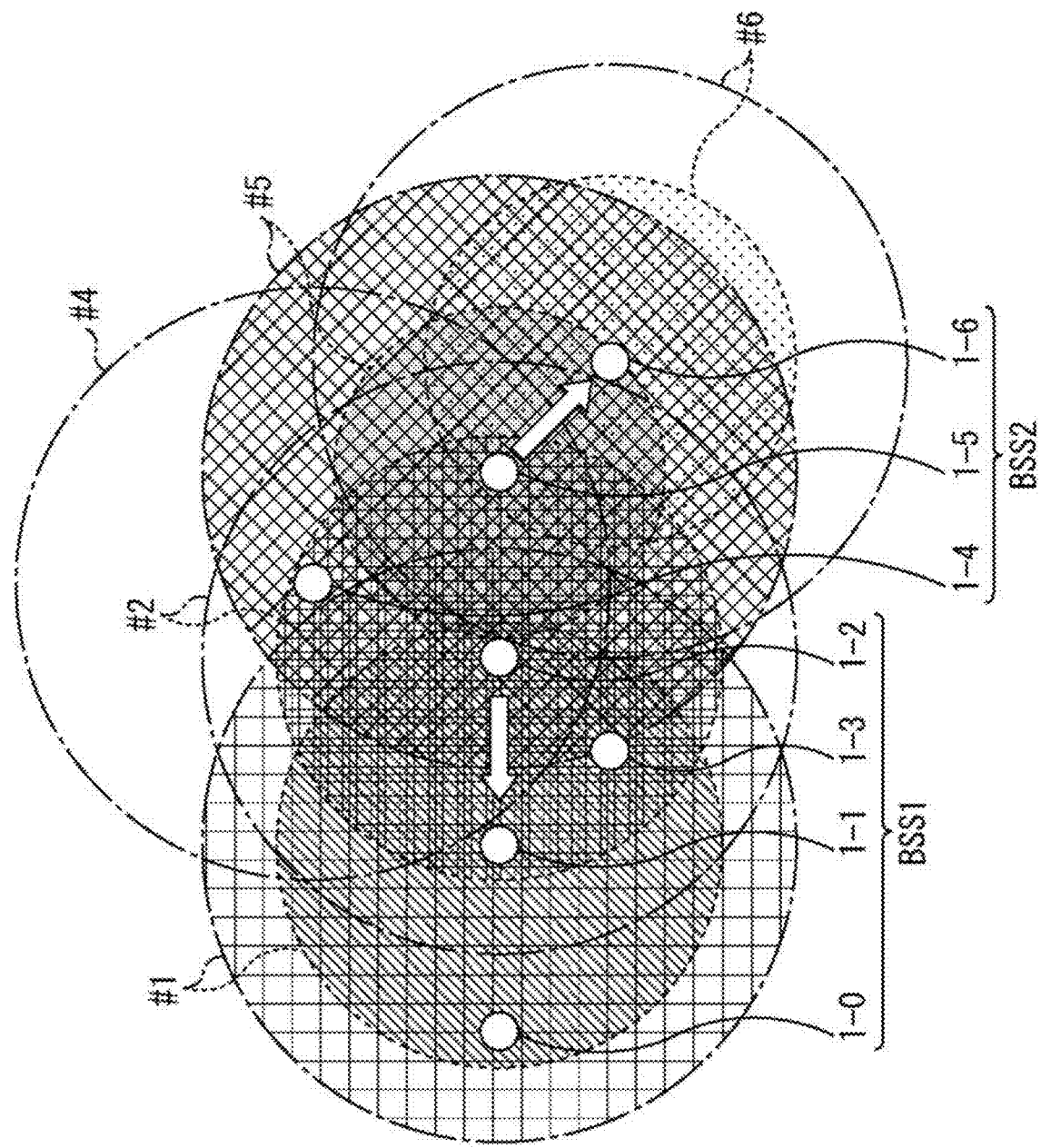
FIG. 5 is a diagram illustrating an example of a configuration of a wireless LAN system according to the present technology.

FIG. 5 is a diagram illustrating an example of a configuration of a wireless LAN system according to the present technology.

As in the case of FIG. 1, the wireless LAN system in FIG. 5 includes network groups BSS1 and BSS2. The same descriptions as those given above will be appropriately omitted.

Circles #1 to #6 indicated by dashed lines schematically represent the radio-wave ranges in a case where communication apparatuses 1-1 to 1-6 perform transmit power control. Circles #1 to #6 indicated by dashed-dotted lines schematically represent the radio-wave ranges with maximum transmit powers in a case where the communication apparatuses 1-1 to 1-6 do not perform transmit power control.

The communication apparatus 1-2 performs communication under transmit power control. The communication apparatus 1-5 performs communication under transmit power control. Each of the communication apparatuses 1-1 to 1-6 appropriately performs either communication under transmit power control or communication with a maximum transmit power without transmit power control.

In the example in FIG. 5, the communication apparatus 1-1 that receives a data frame transmitted from the communication apparatus 1-0 in the BSS1 transmits a using signal according to the present technology as a receiving operation. Further, the communication apparatus 1-2 belonging to the BSS2 can perform transmission without affecting the reception by the communication apparatus 1-1.

That is, in a case where the communication apparatus 1-1 does not control transmit power as indicated by the dashed-dotted circle #1, the communication apparatus 1-0 and the communication apparatuses 1-2 to 1-4 receive the using signal transmitted from the communication apparatus 1-1 and recognize that the communication apparatus 1-1 is using the transmission path to receive a signal transmitted therethrough.

The communication apparatus 1-5 is receiving data transmitted from the communication apparatus 1-2 as indicated by the dashed-dotted circle #2. However, since the communication apparatus 1-5 has not received the using signal transmitted from the communication apparatus 1-1, the communication apparatus 1-5 can transmit a signal to another communication apparatus without affecting the reception by the communication apparatus 1-1 that is receiving the data from the communication apparatus 1-2. Further, when transmitting a signal, the communication apparatus 1-5 can transmit the signal to the communication apparatus 1-5 by controlling transmit power as indicated by the dashed circle #5 so as not to affect the communication apparatus 1-2 receiving a response such as an ACK frame transmitted from the communication apparatus 1-1.

However, transmitting a signal from the communication apparatus 1-2 to the communication apparatus 1-4 without performing transmit power control as indicated by the dashed-dotted circle #5 is refrained. This is because transmitting a response such as an ACK frame from the communication apparatus 1-4 as indicated by the dashed-dotted circle #4 affects reception of signals by the communication apparatus 1-1 and the communication apparatus 1-2.

<Example of Conventional Communication Control>

Figure 6:
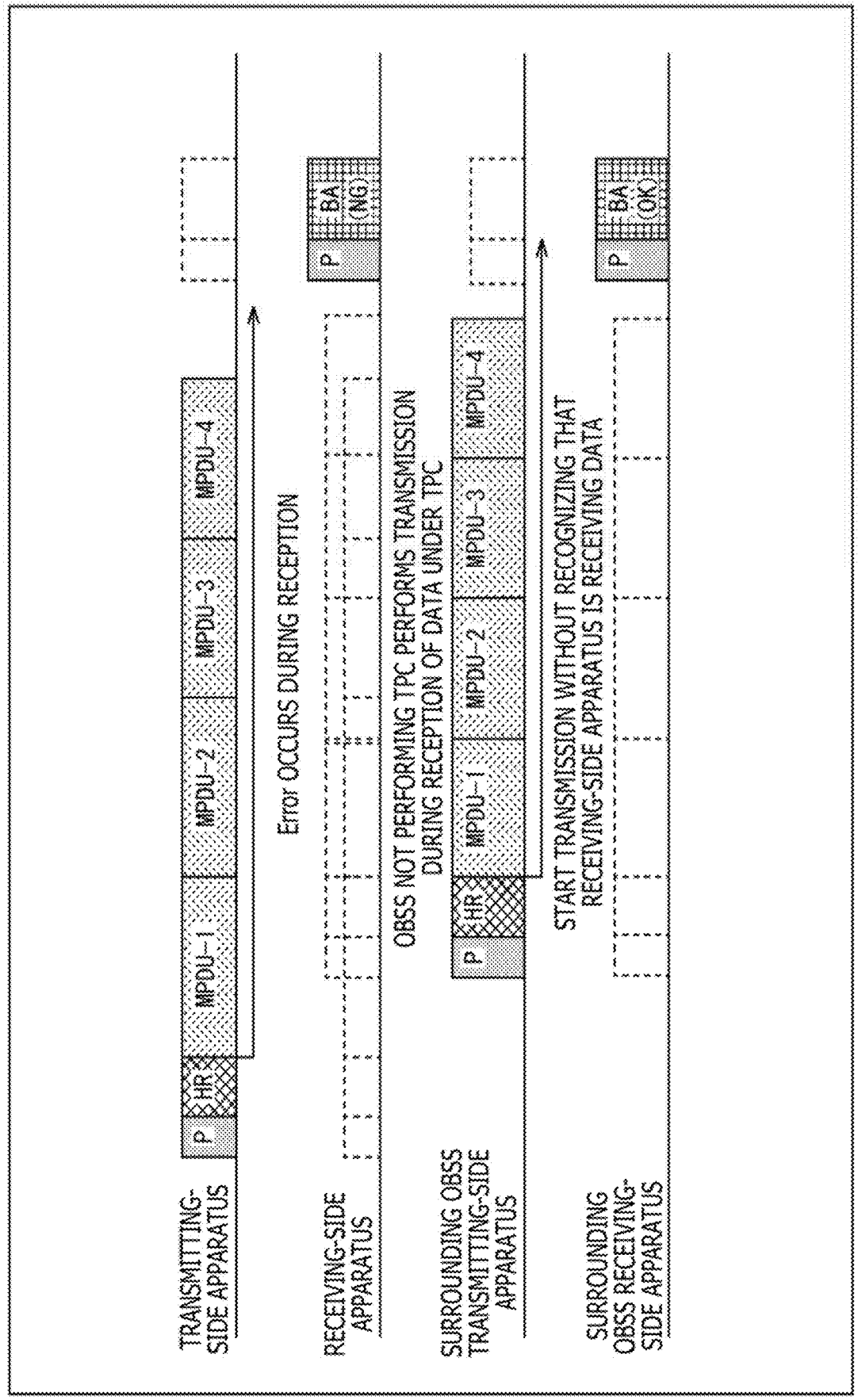
FIG. 6 is a diagram illustrating a state where a reception error occurs in a case where conventional transmit power control is performed.

FIG. 6 is a diagram illustrating a state where a reception error occurs in a case where conventional transmit power control is performed.

In order from the top, a transmission or reception state of each of a transmitting-side apparatus, a receiving-side apparatus, a surrounding OBSS transmitting-side apparatus, and a surrounding OBSS receiving-side apparatus is illustrated. The horizontal direction represents time.

The transmitting-side apparatus is the communication apparatus 1 serving as the transmitting side and corresponds to the communication apparatus 1-0 in FIG. 1. The receiving-side apparatus is the communication apparatus 1 serving as the receiving side and corresponds to the communication apparatus 1-1 in FIG. 1. The OBSS transmitting-side apparatus is the communication apparatus 1 serving as the transmitting side in a surrounding OBSS and corresponds to the communication apparatus 1-2 in FIG. 1. The OBSS transmitting-side apparatus is present in the vicinity of the receiving-side apparatus in the BSS. The surrounding OBSS receiving-side apparatus is the communication apparatus 1 serving as the receiving side in the surrounding OBSS and corresponds to the communication apparatus 1-3 in FIG. 1. It is noted that the OBSS is a BSS that overlaps with the BSS of the transmitting-side apparatus and the receiving-side apparatus.

With reference to FIG. 6, a description will be given of a case where the surrounding OBSS transmitting-side apparatus starts transmitting a data frame to the surrounding OBSS receiving-side apparatus with a maximum transmit power without controlling transmit power, while the transmitting-side apparatus is transmitting a data frame to the receiving-side apparatus with a controlled transmit power.

In FIG. 6, a solid line represents a transmitted data frame, while a dashed line represents a received data frame. The height of a square indicating the data frame represents the level of power (transmit power or reception power).

As illustrated at the top, the transmitting-side apparatus sequentially transmits a preamble (P), header information (HR), an MPDU (MAC layer protocol data unit)-1, an MPDU-2, an MPDU-3, and an MPDU-4. This is a data frame in which the MPDU-1, the MPDU-2, the MPDU-3, and the MPDU-4 are aggregated (concatenated).

At this time, the transmit power of the transmitting-side apparatus is suppressed. Thus, as illustrated in the third row from the top, the surrounding OBSS transmitting-side apparatus cannot detect the data frame transmitted from the transmitting-side apparatus and erroneously determines that the transmission path is available. Then, the surrounding OBSS transmitting-side apparatus starts transmitting the data frame.

That is, while the data frame transmitted under transmit power control (TPC: Transmit Power Control) is being received, the surrounding OBSS transmitting-side apparatus that is not performing transmit power control starts transmitting a preamble (P), header information (HR), an MPDU-1, an MPDU-2, an MPDU-3, and an MPDU-4.

At this time, as illustrated in the second row from the top, the receiving-side apparatus receiving the data frame transmitted from the transmitting-side apparatus even receives the data frame transmitted from the surrounding OBSS transmitting-side apparatus because the surrounding OBSS transmitting apparatus is present in the vicinity of the receiving-side apparatus and the reception electric field strength is high.

As a result, a reception error occurs in the receiving-side apparatus. After the completion of reception of the data frame, the receiving-side apparatus transmits a preamble (P) and an ACK frame (BA: block ACK). The ACK frame (NG) transmitted here indicates a failure of data frame reception.

Meanwhile, as illustrated in the fourth row from the top, the surrounding OBSS receiving-side apparatus is receiving only the data frame transmitted from the surrounding OBSS transmitting-side apparatus. After the completion of reception of the BSS data frame, the surrounding OBSS receiving-side apparatus transmits a preamble and an ACK frame. The ACK frame (OK) transmitted here indicates a success of data frame reception.

In this manner, although the receiving-side apparatus receives the data frame transmitted from the transmitting-side apparatus, the reception error occurs in the receiving-side apparatus since the reception electric field strength of the data frame transmitted from the surrounding OBSS transmitting-side apparatus is high.

Further, the receiving-side apparatus that has failed to receive the data frame transmits the ACK frame indicating NG. The surrounding OBSS receiving-side apparatus that has successfully received the data frame transmits the ACK frame indicating OK. If the timing at which the receiving-side apparatus transmits the ACK frame overlaps with the timing at which the surrounding OBSS receiving-side apparatus transmits the ACK frame, there is a risk that the surrounding OBSS transmitting-side apparatus fails to receive the ACK frame transmitted from the surrounding OBSS receiving-side apparatus.

In this manner, both the apparatus that has performed transmit power control and the apparatus that has not performed transmit power control fail to perform communication correctly.

<Example of Communication Control with Using Signal According to Present Technology>

Figure 7:
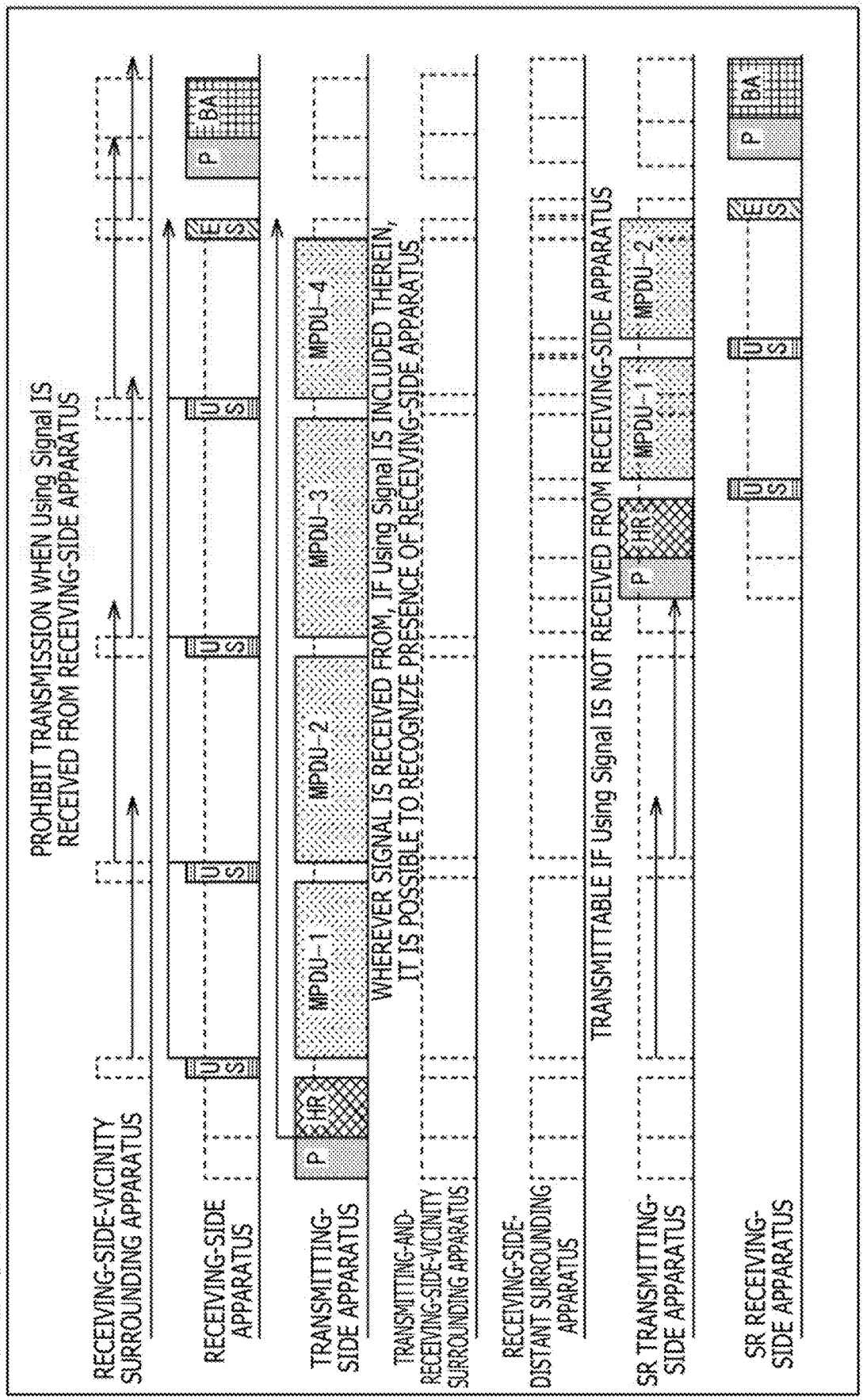
FIG. 7 is a diagram illustrating an example of communication control with a using signal according to the present technology.

FIG. 7 is a diagram illustrating an example of communication control with a using signal according to the present technology.

In order from the top, a transmission or reception state of each of a receiving-side-vicinity surrounding apparatus, a receiving-side apparatus, a transmitting-side apparatus, a transmitting-and-receiving-side-vicinity surrounding apparatus, and a receiving-side-distant surrounding apparatus is illustrated. The same descriptions as those given in FIG. 6 will be omitted.

The receiving-side-vicinity surrounding apparatus is the surrounding communication apparatus 1 that is in the vicinity of the receiving-side apparatus and corresponds to the communication apparatus 1-0 in FIG. 5. The receiving-side apparatus is the communication apparatus 1 serving as the receiving side and corresponds to the communication apparatus 1-1 in FIG. 5. The transmitting-side apparatus is the communication apparatus 1 serving as the transmitting side and corresponds to the communication apparatus 1-2 in FIG. 5. The transmitting-and-receiving-side-vicinity surrounding apparatus is the surrounding communication apparatus 1 that is in the vicinity of the receiving-side apparatus and the transmitting-side apparatus and corresponds to the communication apparatus 1-3 in FIG. 5. The receiving-side-distant surrounding apparatus is the surrounding communication apparatus 1 that is distant from the receiving side and is in the vicinity of the transmitting side and corresponds to the communication apparatus 1-4 in FIG. 5.

An SR transmitting-side apparatus is a communication apparatus that transmits a signal using a spatial reuse technology and corresponds to the communication apparatus 1-5 in FIG. 5. The spatial reuse technology promotes spatial reuse of a frequency resource. An SR receiving-side apparatus is a communication apparatus that receives a signal transmitted using the spatial reuse technology and corresponds to the communication apparatus 1-6 in FIG. 5.

With the spatial reuse technology, even if someone is already using a channel, unless transmission/reception does not affect preceding transmission/reception, the spatial reuse technology permits the transmission/reception by superimposing the transmission/reception on the preceding transmission/reception.

As illustrated in the third row from the top, the transmitting-side apparatus transmits a predetermined preamble (P) and header information (HR).

As illustrated in the second row from the top, the receiving-side apparatus that has received the P and HR transmitted from the transmitting-side apparatus intermittently transmits a using signal (US: Using Signal). Any destination apparatus specified as the destination apparatus in the header information immediately returns the using signal.

As illustrated at the top, the receiving-side-vicinity surrounding apparatus that has received only the using signal can recognize that the communication apparatus (receiving-side apparatus) using the transmission path over a predetermined time is present in its surroundings. Since the receiving-side-vicinity surrounding apparatus recognizes the presence of the communication apparatus using the transmission path, the receiving-side-vicinity surrounding apparatus can prohibit transmission of a data frame.

As illustrated in the fourth row from the top, the transmitting-and-receiving-side-vicinity surrounding apparatus has received both a signal transmitted from the transmitting-side apparatus and the using signal transmitted from the receiving-side apparatus. Since the transmitting-and-receiving-side-vicinity surrounding apparatus has received both signals, the transmitting-and-receiving-side-vicinity surrounding apparatus can recognize that the receiving-side apparatus and the transmitting-side apparatus are present in its vicinity.

As illustrated in the fifth row from the top, the receiving-side-distant surrounding apparatus has received only the signal transmitted from the transmitting-side apparatus and has not detected the using signal transmitted from the receiving-side apparatus. Thus, the receiving-side-distant surrounding apparatus can recognize that the communication apparatus (receiving-side apparatus) receiving data transmitted from the transmitting-side apparatus is not present in its own surroundings.

Therefore, even if the receiving-side-distant surrounding apparatus has detected the signal transmitted from the transmitting-side apparatus, the receiving-side-distant surrounding apparatus can perform transmission using the spatial reuse technology (SR). This is because the receiving-side-distant surrounding apparatus is distant from the receiving-side apparatus and does not affect the reception by the receiving-side apparatus very much.

As illustrated in the third row from the top, the transmitting-side apparatus receives the using signal during a GAP period after the predetermined preamble (P) and the header information (HR). After that, the transmitting-side apparatus transmits a first data unit (MPDU-1). The GAP refers to a period of time in which the transmission is suspended. In a case where the transmission of the first data unit ends, the GAP is provided.

As illustrated in the second row from the top, the receiving-side apparatus transmits the using signal during the GAP. Further, following the using signal after the MPDU-1, the subsequent data units (MPDU-2) to (MPDU-3) are transmitted from the transmitting-side apparatus. Each GAP is intermittently provided in a case where the end of each data unit has arrived. The receiving-side apparatus intermittently transmits the using signal (US) during each GAP.

Following the using signal, the transmitting-side apparatus transmits the last data unit (MPDU-4). After that, as illustrated in the second row from the top, the receiving-side apparatus may transmit an end signal (ES). After transmitting the end signal (ES), the receiving-side apparatus may return a block ACK frame to the transmitting-side apparatus after a predetermined time has elapsed.

Meanwhile, as illustrated in the sixth row from the top, the SR transmitting-side apparatus that performs transmission using the spatial reuse technology also provides the GAP after a predetermined preamble (P) and header information (HR). After that, the SR transmitting-side apparatus transmits a first data unit (MPDU-1).

As illustrated in the seventh row from the top, the SR receiving-side apparatus that has received a signal transmitted using the spatial reuse technology also transmits a using signal during the GAP provided by the SR transmitting-side apparatus. The SR receiving-side apparatus may also transmit an end signal (ES) or return a block ACK frame.

<Example of Configuration of Communication Apparatus According to Present Technology>

Figure 8:
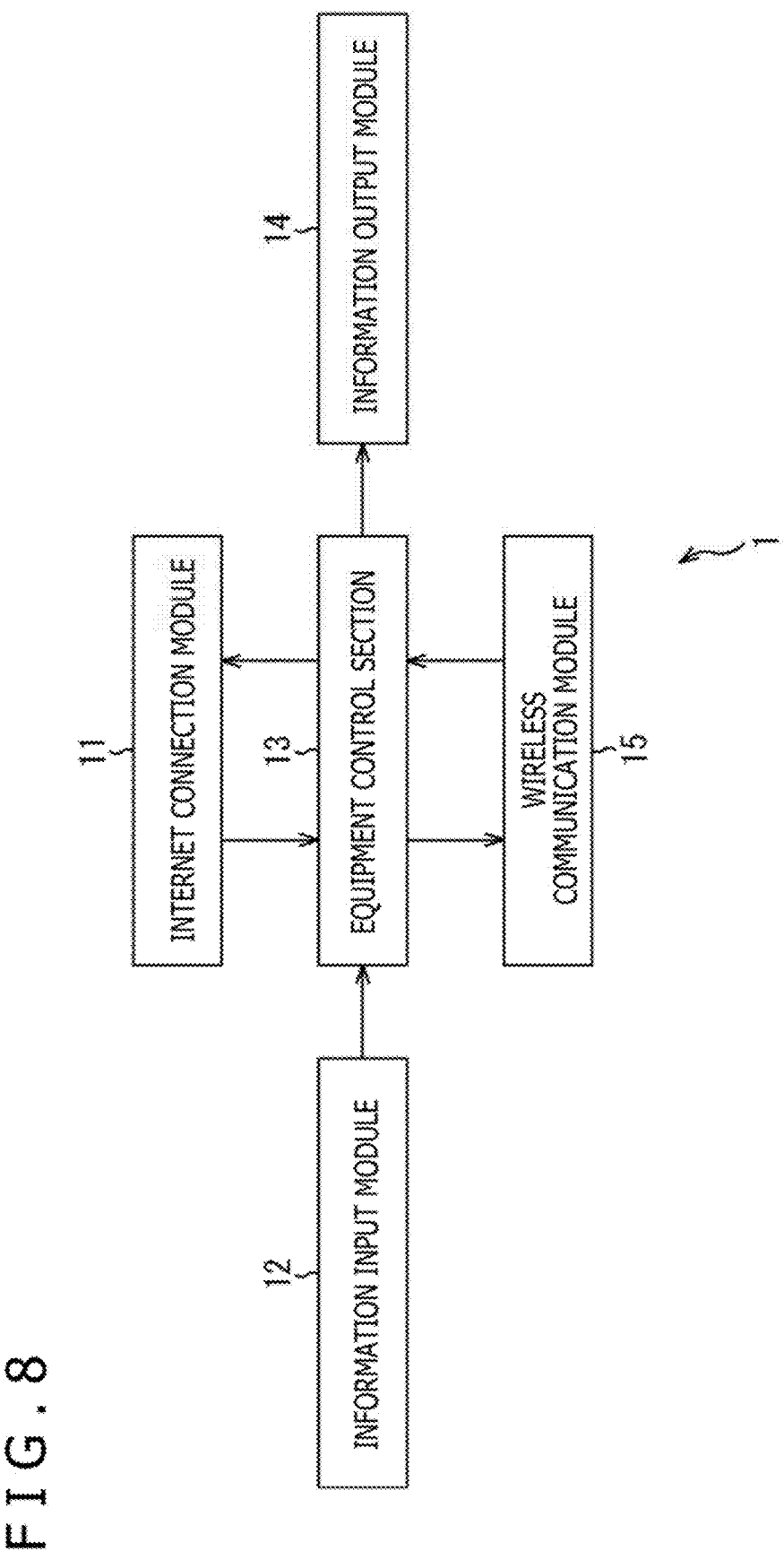
FIG. 8 is a block diagram illustrating an example of a configuration of a communication apparatus to which the present technology is applied.

FIG. 8 is a block diagram illustrating an example of a configuration of the communication apparatus to which the present technology is applied.

Here, the communication apparatus 1 is described as operable either as an access point or a communication device that is included in a wireless LAN system. Any sections unnecessary for each operation may be omitted where necessary.

The communication apparatus 1 includes an Internet connection module 11, an information input module 12, an equipment control section 13, an information output module 14, and a wireless communication module 15.

In a case where the Internet connection module 11 operates as an access point, the Internet connection module 11 functions as an adapter that connects to an Internet network by wire.

The information input module 12 is a section that receives an operation requested by the user in a case where the operation is input. On the basis of an input from a keyboard or the user's voice, the information input module 12 determines the input.

The equipment control section 13 centrally manages the control of the operation of the communication apparatus 1 and stores functions corresponding to a CPU (Central Processing Unit) that performs arithmetic processing, an OS, and applications.

The information output module 14 is, for example, a section that outputs information to the user. For example, the information output module 14 outputs desired data to the user by displaying the information regarding a display or the like.

The wireless communication module 15 operates as a communication module for actually performing a wireless communication operation.

<Example of Functional Configuration of Wireless Communication Module>

Figure 9:
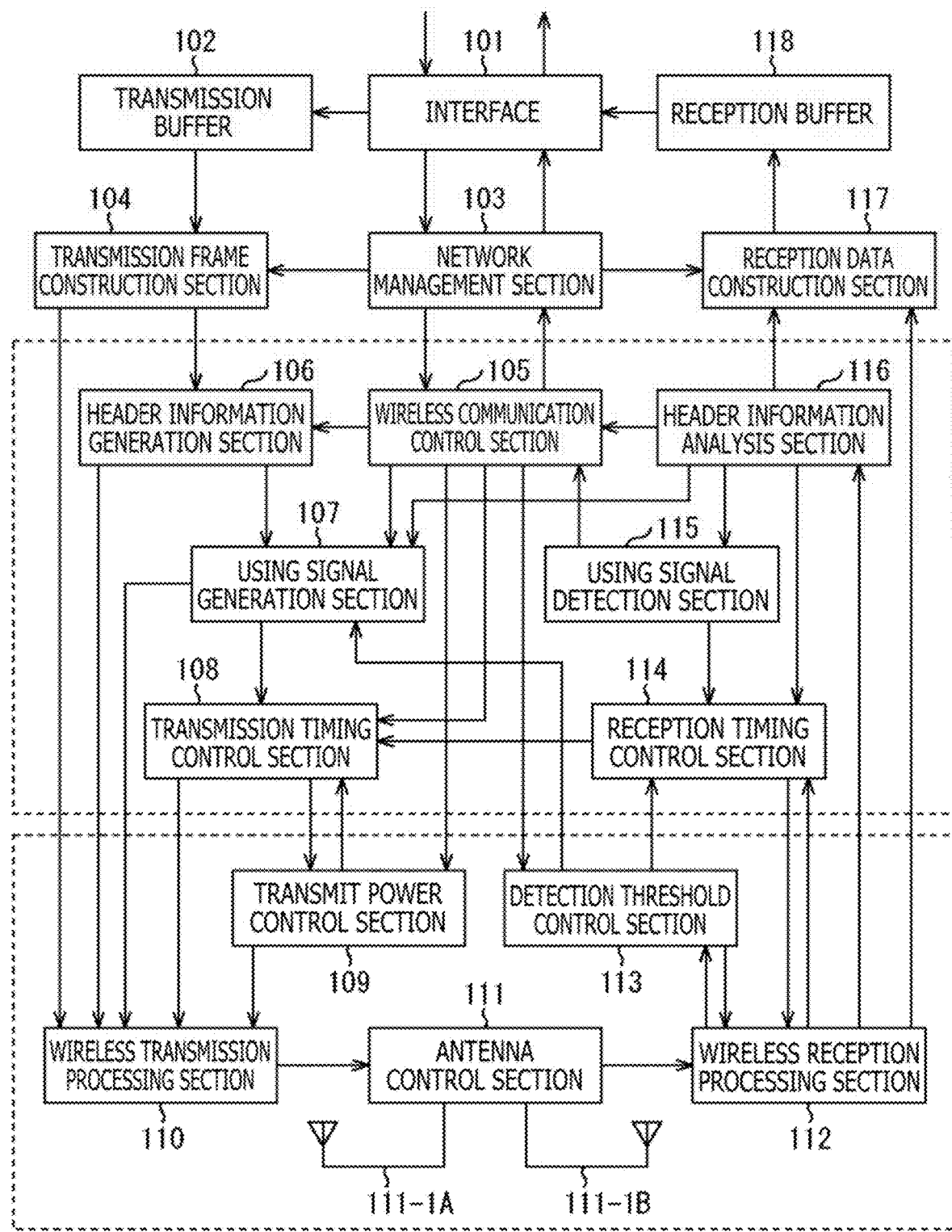
FIG. 9 is a block diagram illustrating an example of a configuration of a wireless communication module.

FIG. 9 is a block diagram illustrating an example of a functional configuration of the wireless communication module in FIG. 8.

The wireless communication module 15 includes an interface 101, a transmission buffer 102, a network management section 103, a transmission frame construction section 104, a wireless communication control section 105, a header information generation section 106, and a using signal generation section 107.

The wireless communication module 15 includes a transmission timing control section 108, a transmit power control section 109, a wireless transmission processing section 110, an antenna control section 111, an antenna 111-1A, an antenna 111-1B, and a wireless reception processing section 112.

In addition, the wireless communication module 15 includes a detection threshold control section 113, a reception timing control section 114, a using signal detection section 115, a header information analysis section 116, a reception data construction section 117, and a reception buffer 118.

The wireless communication control section 105, the header information generation section 106, the using signal generation section 107, the transmission timing control section 108, the reception timing control section 114, the using signal detection section 115, and the header information analysis section 116, which are surrounded by a dashed frame in the center, are sections that perform communication control.

The transmit power control section 109, the wireless transmission processing section 110, the antenna control section 111, the antenna 111-1A, the antenna 111-1B, the wireless reception processing section 112, and the detection threshold control section 113, which are surrounded by a dashed line at the bottom, are sections that are related to actual communication processing and power control.

The interface 101 is a section of an interface with the equipment control section 13 in FIG. 8. The interface 101 supplies data supplied from the equipment control section 13 to the transmission buffer 102 and supplies data accumulated in the reception buffer 118 to the equipment control section 13. The interface 101 supplies information supplied from the equipment control section 13 to the network management section 103 and supplies surrounding wireless network information managed by the network management section 103 to the equipment control section 13.

The transmission buffer 102 stores MPDU data supplied from the equipment control section 13 and to be transmitted wirelessly. The transmission buffer 102 supplies the stored data to the transmission frame construction section 104 at a predetermined timing.

On the basis of information supplied from the wireless communication control section 105 and the interface 101, the network management section 103 manages attribute information such as an address of a communication apparatus included in an OBSS. The OBSS is a surrounding wireless network that overlaps with its own BSS between its own communication apparatus 1 and its surrounding communication apparatus 1. The network management section 103 supplies the managing BSS attribute information to the transmission frame construction section 104, the wireless communication control section 105, the interface 101, and the reception data construction section 117, where necessary.

The transmission frame construction section 104 uses the data from the transmission buffer 102 to generate a wireless communication frame in a predetermined aggregation unit for wireless communication and supplies the generated wireless communication frame to the header information generation section 106 and the wireless transmission processing section 110.

On the basis of information supplied from the network management section 103, the using signal detection section 115, and the header information analysis section 116, the wireless communication control section 105 performs access communication control on a wireless transmission path in accordance with a predetermined communication protocol.

The wireless communication control section 105 controls power related to communication. For example, the wireless communication control section 105 controls the transmit power control section 109 to cause the transmit power control section 109 to set a transmit power and controls the detection threshold control section 113 to acquire reception power. The wireless communication control section 105 supplies information obtained as the result of the access communication control to the header information generation section 106, the using signal generation section 107, and the network management section 103.

Under the control of the wireless communication control section 105, the header information generation section 106 generates a predetermined preamble and header information that are to be added to a head portion of the data frame generated by the transmission frame construction section 104. The header information generation section 106 supplies the generated predetermined preamble and header information to the using signal generation section 107. The header information generation section 106 adds the generated predetermined preamble and header information to the data frame supplied from the transmission frame construction section 104 and supplies the data frame to the wireless transmission processing section 110.

The using signal generation section 107 generates a using signal on the basis of information supplied from the wireless communication control section 105, the header information generation section 106, and the detection threshold control section 113. The using signal indicates to the surroundings that a data frame is being received and the transmission path is in use. The using signal generation section 107 supplies the generated using signal to the transmission timing control section 108 and the wireless transmission processing section 110.

On the basis of information supplied from the reception timing control section 114 and the transmit power control section 109, the transmission timing control section 108 controls a timing at which the wireless transmission processing section 110 transmits the data frame or the using signal through the transmission path.

Under the control of the wireless communication control section 105 and the transmission timing control section 108, the transmit power control section 109 controls, where necessary, transmit power of a transmission frame that is to be transmitted from the wireless transmission processing section 110 to a destination communication apparatus.

The wireless transmission processing section 110 converts any of the data frame to which the header information generated by the header information generation section 106 is added, the data frame generated by the transmission frame construction section 104, the using signal generated by the using signal generation section 107, and the transmission frame into a predetermined baseband signal and performs modulation processing and signal processing thereon. The wireless transmission processing section 110 supplies the baseband signal having undergone the signal processing to the antenna control section 111 such that the baseband signal is transmitted with the transmit power controlled by the transmit power control section 109 at the timing controlled by the transmission timing control section 108.

The antenna control section 111 controls the antennas 111-1A and 111-1B including a plurality of elements, and transmits or receives a signal from the transmission path. At least one of the antenna 111-1A or the antenna 111-1B transmits a signal from the wireless transmission processing section 110 to the transmission path. At least one of the antenna 111-1A or the antenna 111-1B supplies a signal received from the transmission path to the wireless reception processing section 112.

The wireless reception processing section 112 receives, via the antenna 111-A or the antenna 111-1B, a data frame wirelessly transmitted in a predetermined format. The wireless reception processing section 112 supplies the received data frame to the detection threshold control section 113, the reception timing control section 114, the header information analysis section 116, and the reception data construction section 117.

The detection threshold control section 113 sets a threshold for detecting a preamble and a midamble included in a received signal and detects a signal (data frame) having reception power larger than the set threshold. The detection threshold control section 113 supplies information regarding the detected reception power to the using signal generation section 107, the reception timing control section 114, and the wireless reception processing section 112.

The reception timing control section 114 controls a timing at which the wireless reception processing section 112 receives a data frame or an inserted using signal on the basis of information regarding the reception power supplied from the detection threshold control section 113, parameters of the using signal detected by the using signal detection section 115, header information analyzed by the header information analysis section 116, and the like. The reception timing control section 114 supplies information regarding the timing for receiving the data frame or the inserted using signal to the transmission timing control section 108.

The using signal detection section 115 detects the using signal from the header information analyzed by the header information analysis section 116, thereby recognizing that the transmission path is in use. The using signal detection section 115 analyzes the parameters described in the using signal and supplies the analyzed parameters to the reception timing control section 114 and the wireless communication control section 105.

The header information analysis section 116 detects a preamble added to the head of the frame and extracts header information to analyze the contents of the header information. Although details will be described later, since the using signal is also compatible with an existing preamble, the using signal is extracted as the header information. The header information analysis section 116 supplies the header information, the result of the analysis of the header information, and the like to the reception timing control section 114, the using signal detection section 115, the reception data construction section 117, and the wireless communication control section 105.

The reception data construction section 117 generates an aggregated reception frame received by the wireless reception processing section 112 as reception data in a predetermined unit on the basis of network management information managed by the network management section 103, the result of the analysis of the header information analyzed by the header information analysis section 116, and the like. The reception data construction section 117 accumulates the reception data in the reception buffer 118.

The reception buffer 118 stores MPDU data generated by the reception data construction section 117. The reception buffer 118 reads the MPDU data at a predetermined timing and supplies the read MPDU data to the equipment control section 13 via the interface 101.

In the example in FIG. 9, since the using signal is compatible with the existing preamble, the configuration described is such that the using signal detection section 115 detects the using signal from the header information supplied from the header information analysis section 116. It is noted that, however, the using signal detection section 115 may directly detect the using signal from the received frame.

<Example of Frame Configuration>

Figure 10:
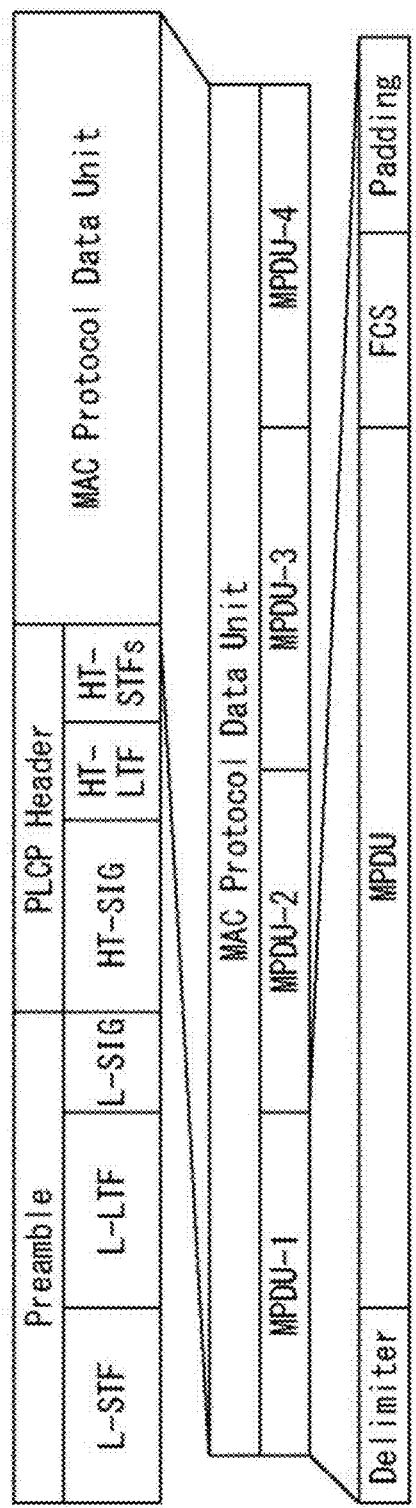
FIG. 10 is a diagram illustrating an example of a configuration of an A-MPDU frame.

FIG. 10 is a diagram illustrating an example of a configuration of a conventional aggregated MPDU (A-MPDU) frame.

The A-MPDU frame includes a predetermined preamble (Preamble), a PLCP header (Header), and a MAC layer protocol data unit (MPDU).

The preamble includes a legacy short training field (L-STF), a legacy long training field (L-LTF), and a legacy signal (L-SIG).

The L-STF indicates the head of the frame. The L-LTF indicates information for timing and frequency error correction. The L-SIG indicates the settings of the modulation scheme and coding rate of a subsequent data portion and the signal duration.

The PLOP header includes a high throughput signal (HT-SIG), a high throughput short training field (HT-STF), a high throughput long training field (HT-STF), and the like.

The HT-SIG and the HT-STF are recognized as part of the preamble. In general, various kinds of information required for newly enhanced functions are described in the HT-SIG and the HT-STF. The HT-STF is used for channel estimation.

Following the preamble and the like, the MPDU is configured as a data payload. A plurality of MPDU subframes can be aggregated into the MPDU and configured as a single burst. FIG. 10 illustrates an example in which four subframes from the MPDU-1 to the MPDU-4 are aggregated.

In each MPDU subframe, a frame check sequence (FCS) is added to an actual data portion (MPDU) of a delimiter (Delimiter). In the delimiter, length information and the like are described. If necessary, padding processing is also performed. It is noted that the detailed configuration of the MPDU subframes will be described later with reference to FIG. 20.

Figure 11:
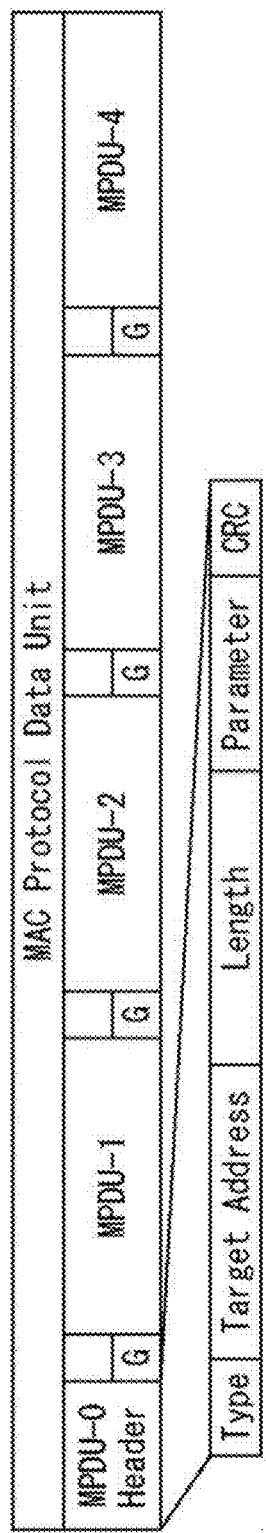
FIG. 11 is a diagram illustrating an example of a configuration of an A-MPDU frame used in the present technology.

FIG. 11 is a diagram illustrating an example of a configuration of an A-MPDU frame used in the present technology.

FIG. 11 illustrates an example of a configuration of the MAC layer protocol data unit (MPDU) illustrated in FIG. 10.

In the frame in FIG. 11, a GAP section indicated by G is inserted between the MPDUs. With this configuration, the communication apparatus 1 serving as the receiving side can return the using signal at the GAP timing.

That is, the GAP serves as a time interval during which the using signal can be returned. The GAP does not need to include a time interval for a predetermined interframe space. For example, the GAP may have an information length of the using signal frame, including a switching time between a transmission operation and a reception operation.

Further, an MPDU-0 header is set at the head of the A-MPDU. The MPDU-0 header includes a Type indicating a frame type, information from which address information of the target communication apparatus 1 can be identified, length information indicating the entire length, various kinds of parameter information, a CRC for error detection, and the like.

Desirably, in a case where address information of the communication apparatus 1 serving as the receiving side that has received the frame is described as the address information of the target communication apparatus 1, the communication apparatus 1 serving as the receiving side prepares for transmission of the using signal, so that the communication apparatus 1 serving as the receiving side can be ready for immediate transmission of the using signal in a case where the GAP timing arrives.

It is noted that in the MPDU, the GAPs are followed by the respective MPDU subframes illustrated in FIG. 10. The MPDU in FIG. 11 includes the four subframes of the MPDU-1 to the MPDU-4.

Further, each MPDU in FIG. 11 may be fragmented to a predetermined length and configured as a MAC layer service data unit (MSDU).

FIG. 12 is a diagram illustrating an example of a configuration of a using signal (Using Signal) frame.

The Using Signal frame in FIG. 12 includes a Using Signal parameter, which is a characteristic of the present technology, in addition to an L-STF, an L-LTF, and an L-SIG.

That is, the parameter arrangement of the L-STF, the L-LTF, and the L-SIG is compatible with that of a preamble according to a conventional scheme. Thus, even an existing communication apparatus can recognize the presence of the Using Signal frame.

FIG. 13 is a diagram illustrating an example of a configuration of an End Signal frame.

The End Signal frame in FIG. 13 includes an L-STF, an L-LTF, and an L-SIG.

It is noted that all the parameters described in the L-SIG of the End Signal frame may be set to 0 to notify that the A-MPDU frame has ended.

Figure 14:
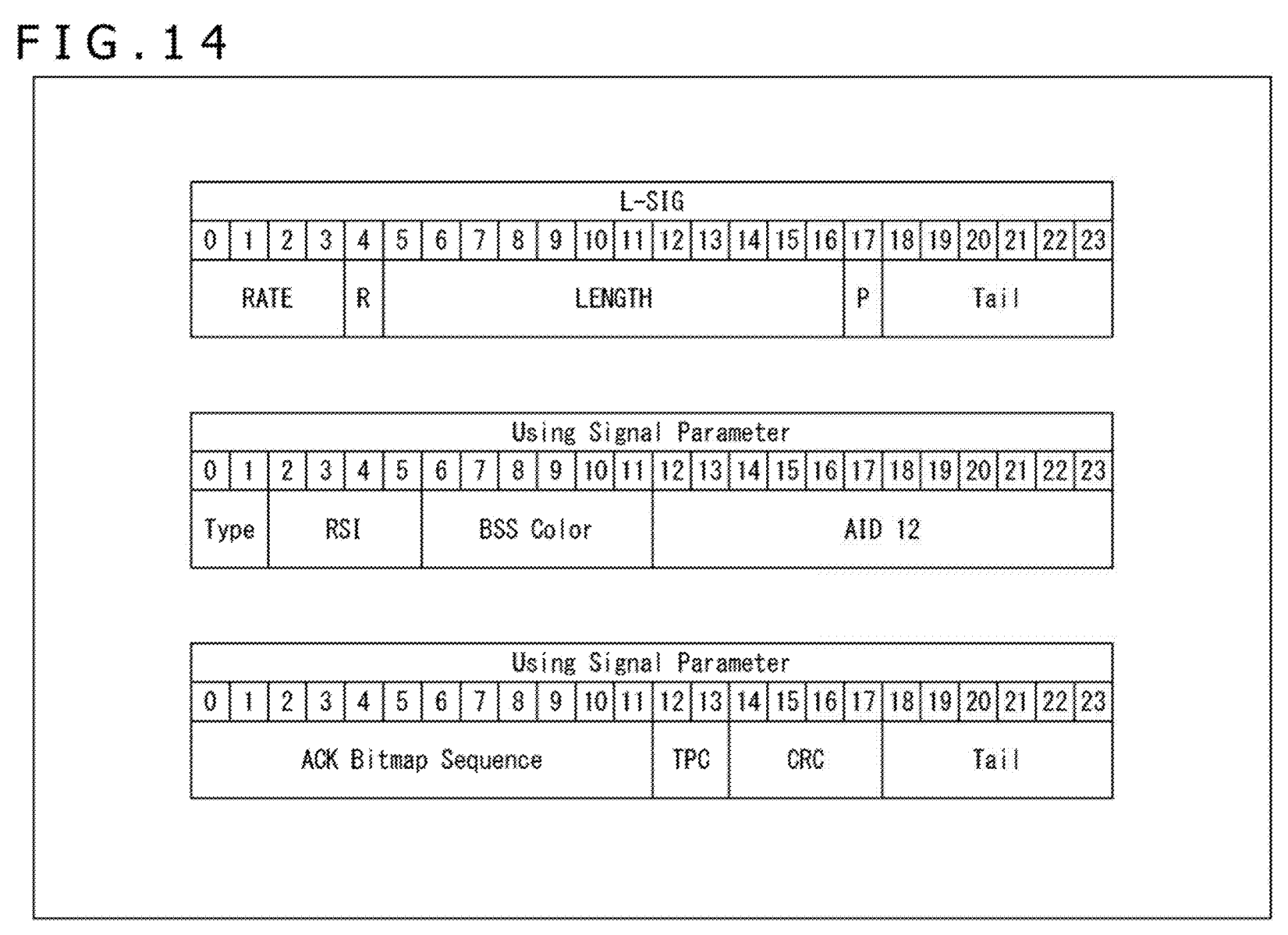

FIG. 14 is a diagram illustrating the parameter arrangement of the L-SIG and the Using Signal parameter.

In order to maintain compatibility with existing products, the L-SIG includes a RATE field (4 bits), an R bit (1 bit), a LENGTH field (12 bits), a parity P bit (1 bit), and a Tail bits field (6 bits). The RATE field indicates the modulation scheme and coding rate of a data portion. The R bit indicates that this is the L-SIG according to the present technology. The LENGTH field indicates the information length of the rest of the data portion. For example, a reception duration is described in the LENGTH field. The reception duration is calculated on the basis of a parameter added to a data frame in which the duration of the data frame is described.

While the Using Signal parameter has, for example, a length of two OFDM symbols, the Using Signal parameter may have a length of one OFDM symbol or three or more OFDM symbols depending on the amount of information.

The Using Signal parameter includes each parameter of a Type (2 bits), an RSI (4 bits), BSS Color information (6 bits), AID12 information (12 bits), ACK bitmap information (Sequence) (12 bits), TPC information (2 bits), a CRC (4 bits), and a Tail bits field (6 bits).

The Type indicates a frame type. The RSI is information regarding the reception electric field strength of a data frame obtained when the data frame is received. The BSS Color is information identifying a BSS (network). The AID12 is an association identifier from which the communication apparatus can be identified. The TPC information is information regarding a transmit power control parameter used when the using signal is transmitted. The TPC information may be information added to the header information of the data frame. The Using Signal parameter may include information specifying a communication apparatus that has transmitted the data frame.

Recent years have been such that in the case of detecting a signal from an OBSS, unless the transmitted signal can be received, it is not possible to determine whether the transmission path is in use in order to apply the spatial reuse technology that is being standardized.

That is, the communication apparatus 1 that is receiving a signal in the OBSS does not transmit a signal in which the BSS color information is described. Further, the communication apparatus 1 serving as the receiving side cannot transmit a signal during reception. Therefore, there have been cases where a signal at the level that interferes with reception is transmitted using the spatial reuse technology.

By contrast, the Using Signal parameter includes the BSS Color information. Therefore, any surrounding communication apparatus 1 that has received the using signal can recognize which BSS the communication apparatus 1 that is receiving data belongs to.

Further, there has been a need for a technology that notifies an overlapping BSS (OBSS) that the transmit power control is being performed within its own BSS.

In the defined spatial reuse technology, a parameter such as the BSS Color information is described in a signal of the communication apparatus 1 serving as the transmitting side. However, what has been needed is to recognize the level required for reception by the communication apparatus 1 serving as the receiving side and then apply the spatial reuse technology without affecting the reception.

By contrast, the TPC information is described in the Using Signal parameter. With this configuration, any communication apparatus 1 that has received the using signal can recognize what level is required for the reception and then apply the spatial reuse technology without affecting the reception.

It is noted that these parameters are examples and may be configured with additional parameters or reduced parameters where necessary. Further, the arrangement of the parameters in FIG. 14 is provisional. The arrangement of the parameters is not limited to this arrangement order, and the arrangement order may also be appropriately changed where necessary.

<Examples of OFDM Signal Configuration and GAP Time>

Next, an OFDM signal will be described step by step. The GAP time will also be described.

Figure 15:
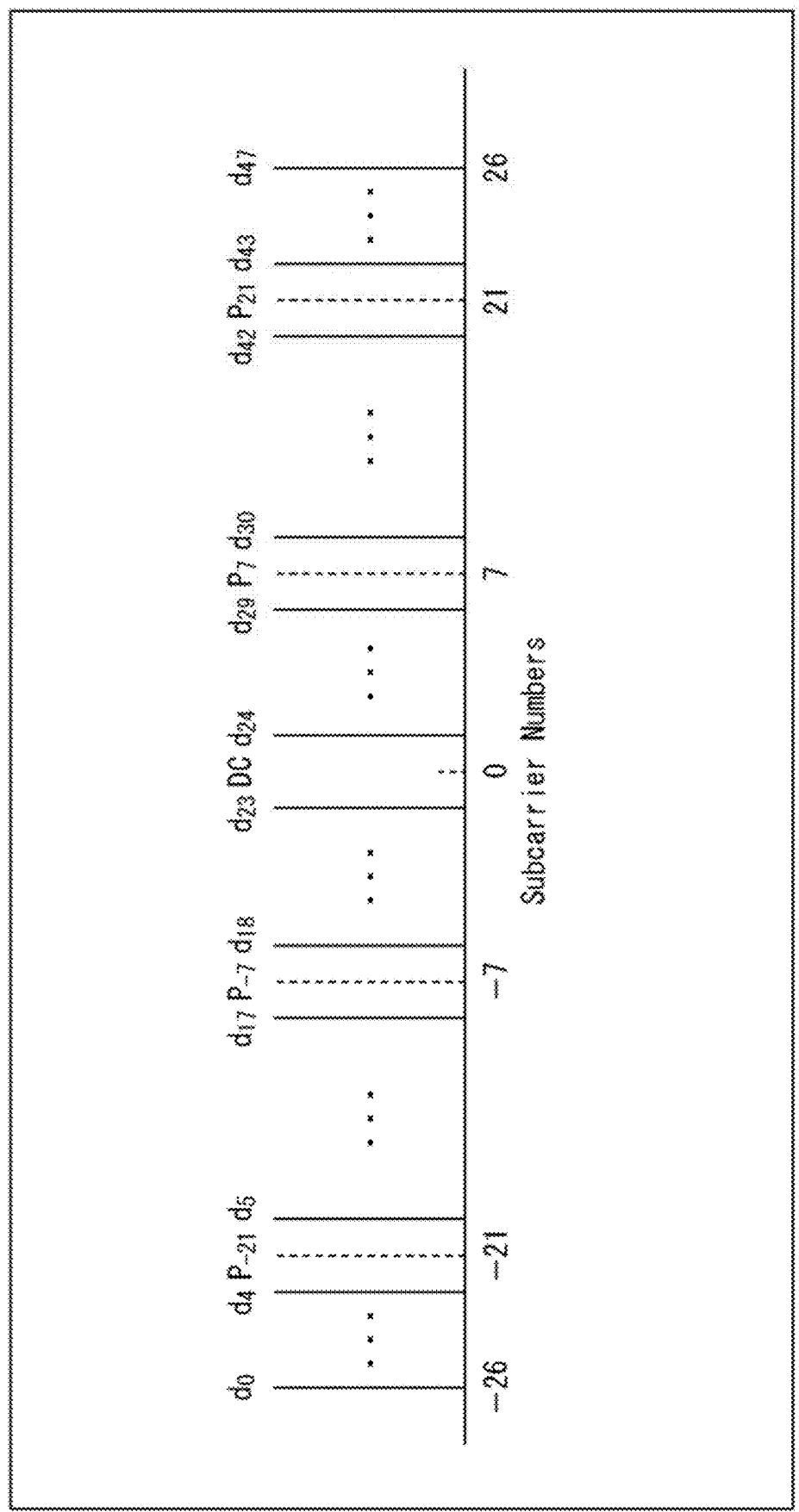
FIG. 15 is a diagram illustrating an example of a configuration of subcarriers of an OFDM signal.

FIG. 15 is a diagram illustrating an example of a configuration of subcarriers of an OFDM signal.

In a 20 MHz bandwidth, a single OFDM symbol includes 52 subcarriers. Among the 52 subcarriers, 4 subcarriers are pilot subcarriers indicated by P in the figure. That is, 48 subcarriers of the single OFDM symbol are used as data subcarriers indicated by D in the figure.

FIG. 15 illustrates a configuration of +/−26 subcarriers (a total of 52 subcarriers) with a center frequency 0 serving as a DC null carrier. Among these subcarriers, four subcarriers −21, −7, +7, and −21 are used as the pilot subcarriers.

FIG. 16 is a diagram illustrating relationships between modulation schemes and coding rates.

As illustrated in FIG. 16, in a case where the modulation scheme is BPSK, the coding rate R=1/2, and coding is performed for each subcarrier, 48 bits of information can be coded and 24 bits of information can be transmitted with 10 FDM symbols, and the data rate is 6 Mb/s (20 MHz channel spacing), 3 Mb/s (10 MHz channel spacing), or 1.5 Mb/s (5 MHz channel spacing). As illustrated, in a case where the modulation scheme is BPSK, the coding rate R=3/4, and coding is performed for each subcarrier, 48 bits of information can be coded and 36 bits of information can be transmitted with 10 FDM symbols, and the data rate is 9 Mb/s (20 MHz channel spacing), 4.5 Mb/s (10 MHz channel spacing), or 2.25 Mb/s (5 MHz channel spacing).

As illustrated, in a case where the modulation scheme is QPSK, the coding rate R=1/2, and coding is performed for every two subcarriers, 96 bits of information can be coded and 48 bits of information can be transmitted with 10 FDM symbols, and the data rate is 12 Mb/s (20 MHz channel spacing), 6 Mb/s (10 MHz channel spacing), or 3 Mb/s (5 MHz channel spacing). As illustrated, in a case where the modulation scheme is QPSK, the coding rate R=3/4, and coding is performed for every two subcarriers, 96 bits of information can be coded and 72 bits of information can be transmitted with 10 FDM symbols, and the data rate is 18 Mb/s (20 MHz channel spacing), 9 Mb/s (10 MHz channel spacing), or 4.5 Mb/s (5 MHz channel spacing).

As illustrated, in a case where the modulation scheme is 16-QAM, the coding rate R=1/2, and the coding is performed for every 4 subcarriers, 192 bits of information can be coded and 96 bits of information can be transmitted with 10 FDM symbols, and the data rate is 24 Mb/s (20 MHz channel spacing), 12 Mb/s (10 MHz channel spacing), or 6 Mb/s (5 MHz channel spacing). As illustrated, in a case where the modulation scheme is 16-QAM, the coding rate R=3/4, and coding is performed for every 4 subcarriers, 192 bits of information can be coded and 144 bits of information can be transmitted with 10 FDM symbols, and the data rate is 36 Mb/s (20 MHz channel spacing), 18 Mb/s (10 MHz channel spacing), or 9 Mb/s (5 MHz channel spacing).

As illustrated, in a case where the modulation scheme is 64-QAM, the coding rate R=2/3, and coding is performed for every 6 subcarriers, 288 bits of information can be coded and 192 bits of information can be transmitted with 10 FDM symbols, and the data rate is 48 Mb/s (20 MHz channel spacing), 24 Mb/s (10 MHz channel spacing), or 12 Mb/s (5 MHz channel spacing). As illustrated, in a case where the modulation scheme is 64-QAM, the coding rate R=3/4, and coding is performed for every 6 subcarriers, 288 bits of information can be coded and 216 bits of information can be transmitted with 10 FDM symbols, and the data rate is 54 Mb/s (20 MHz channel spacing), 27 Mb/s (10 MHz channel spacing), or 13.5 Mb/s (5 MHz channel spacing).

In the wireless LAN system, the amount of information that can be transmitted per 10 FDM symbols varies depending on the modulation scheme (Modulation) and the coding rate (Coding rate) that are in use.

For example, it can be seen from representatives of the example in FIG. 16 that in a case where the modulation scheme is BPSK and the coding rate R=1/2, 24 bits of information can be transmitted with 10 FDM symbols, while in a case where the modulation scheme is 64-QAM and the coding rate R=3/4, 216 bits of information can be transmitted with 10 FDM symbols.

Figure 17:
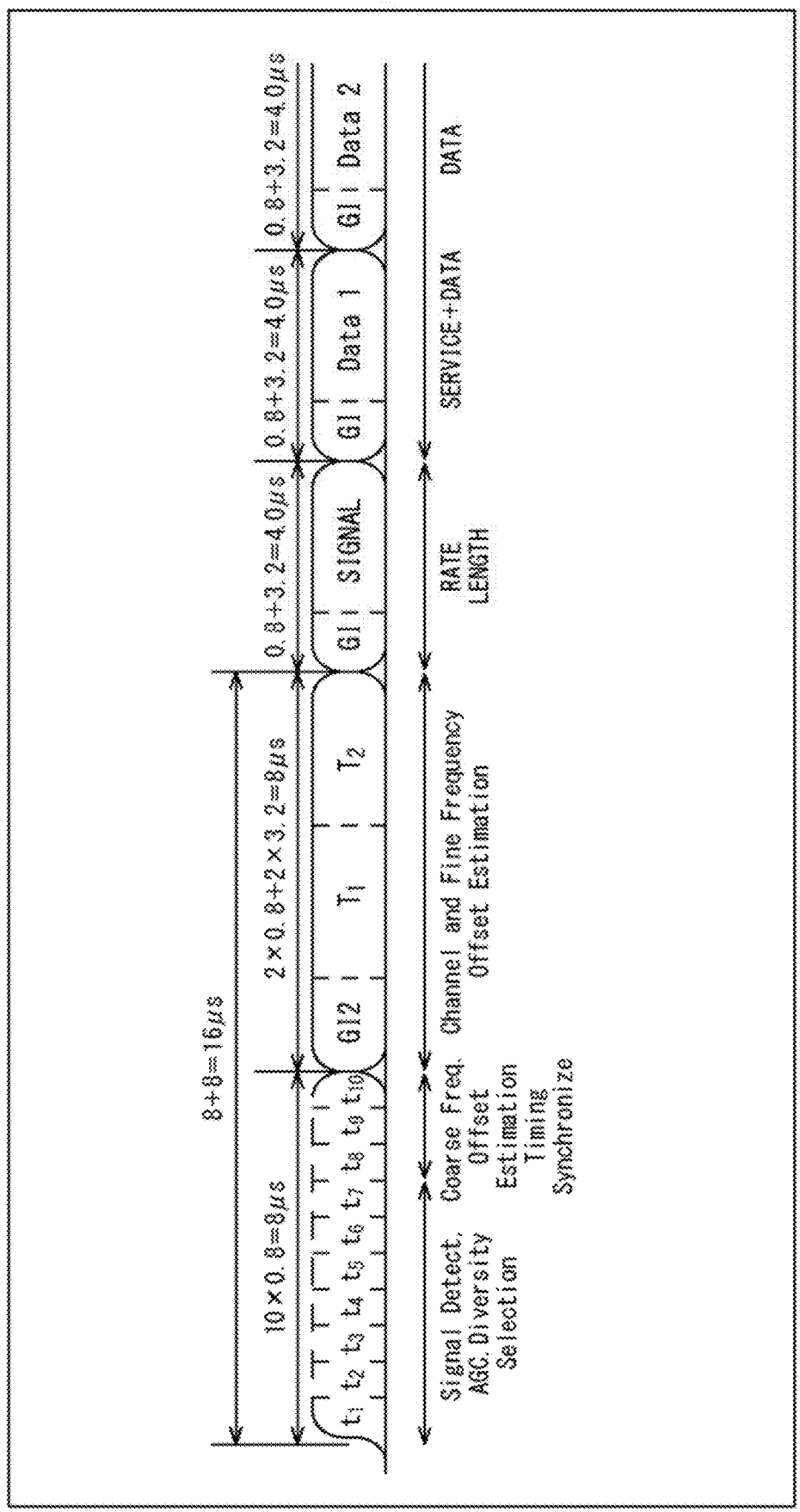
FIG. 17 is a diagram illustrating an example of a configuration of a preamble.

FIG. 17 is a diagram illustrating an example of a configuration of the preamble. FIG. 17 illustrates an example of a detailed configuration of the preamble portion illustrated in FIG. 9.

As illustrated in FIG. 17, the preamble serves as a training sequence added to the head of the frame and includes predetermined parameter values in a format defined to perform signal synchronization.

The preamble in FIG. 17 has a length of (8+8=16 μs) that is twice as long as a data symbol to allow frame detection. The preamble includes two parts: the STF and the long LTF. In the STF, a short synchronization signal is repeated 10 times (t1 to t10). The LTF is used for channel estimation and the like. The STF and the LTF are separated by a guard interval (GI).

In the STF, signal detection, AGC, and diversity selection are performed between t1 and t7, and coarse frequency offset estimation and timing synchronization are performed between t8 and t10. In the LTF, channel and fine frequency offset estimations are performed.

Following the preamble, the Legacy SIGNAL (L-SIG) field portion is configured. After that, the data portion is configured. In the L-SIG, PHY parameters are described. Each of the L-SIG and the data portion is also separated by the guard interval. Since the L-SIG field is always arranged in the first OFDM symbol, transmission can be performed while compatibility with the frame structure according to the existing scheme is maintained.

Figure 18:
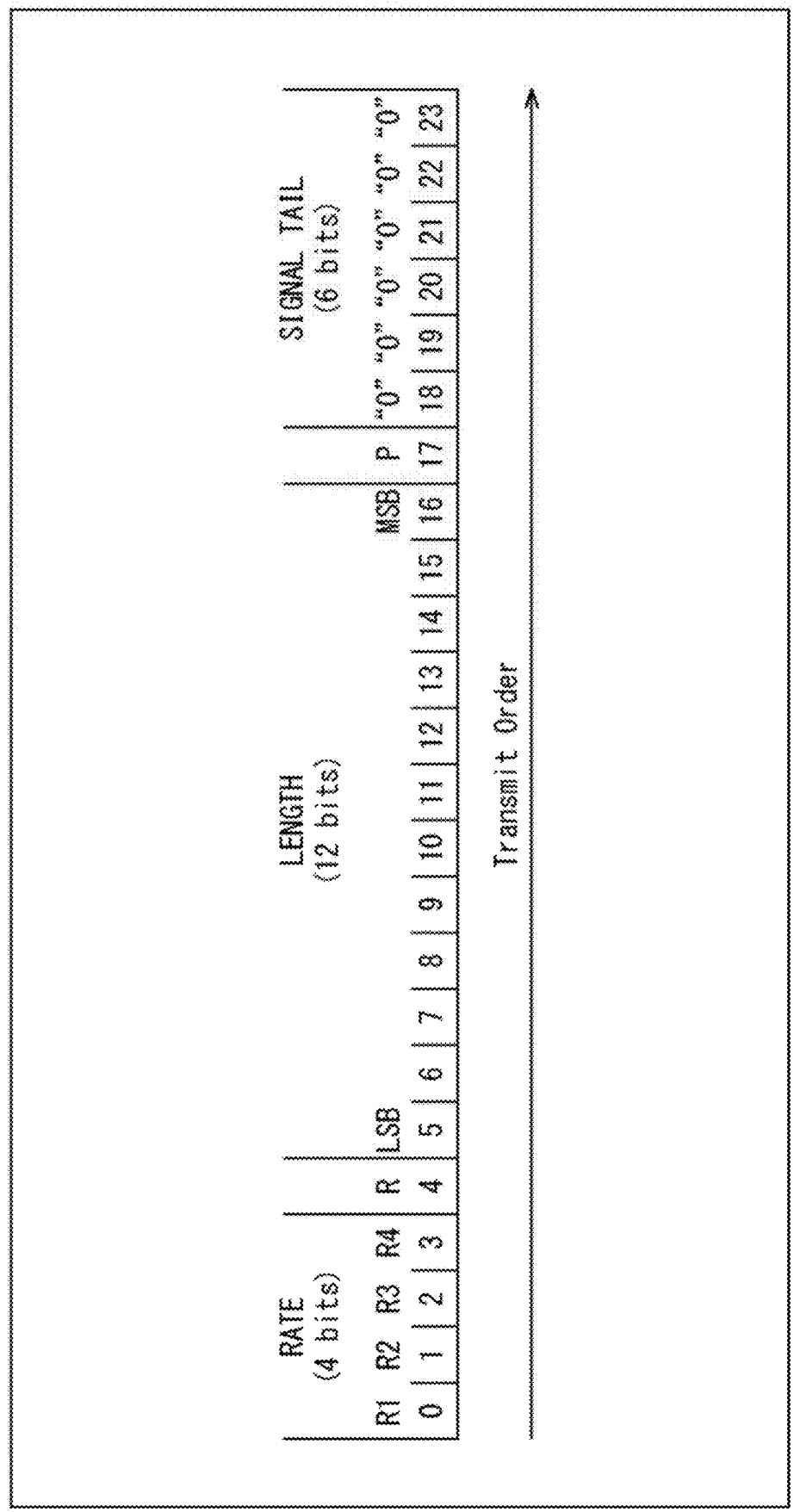
FIG. 18 is a diagram illustrating an example of a configuration of an L-SIG field.

FIG. 18 is a diagram illustrating an example of a configuration of the L-SIG field. Since the example of the configuration of the L-SIG illustrated in FIG. 14 is illustrated in FIG. 18 and the configuration in FIG. 18 is the same as the configuration in FIG. 14, the description thereof is omitted.

That is, the L-SIG field includes the RATE field that specifies the modulation scheme and coding rate of the frame and the LENGTH field that indicates the length of the frame. The Tail bits arranged in the L-SIG field can terminate decoding.

Here, each OFDM symbol has a duration (4μ seconds) as a unit that can be recognized as data during a predetermined time. Thus, transmitting actual data using a plurality of OFDM symbols requires a certain amount of time.

In practice, a SIGNAL field is arranged before a data frame. Additionally, a 16-bit Service is arranged in a first data frame portion, and Tail bits are arranged in a Data portion at the end. A portion short of the OFDM symbol is padded.

Figure 19:
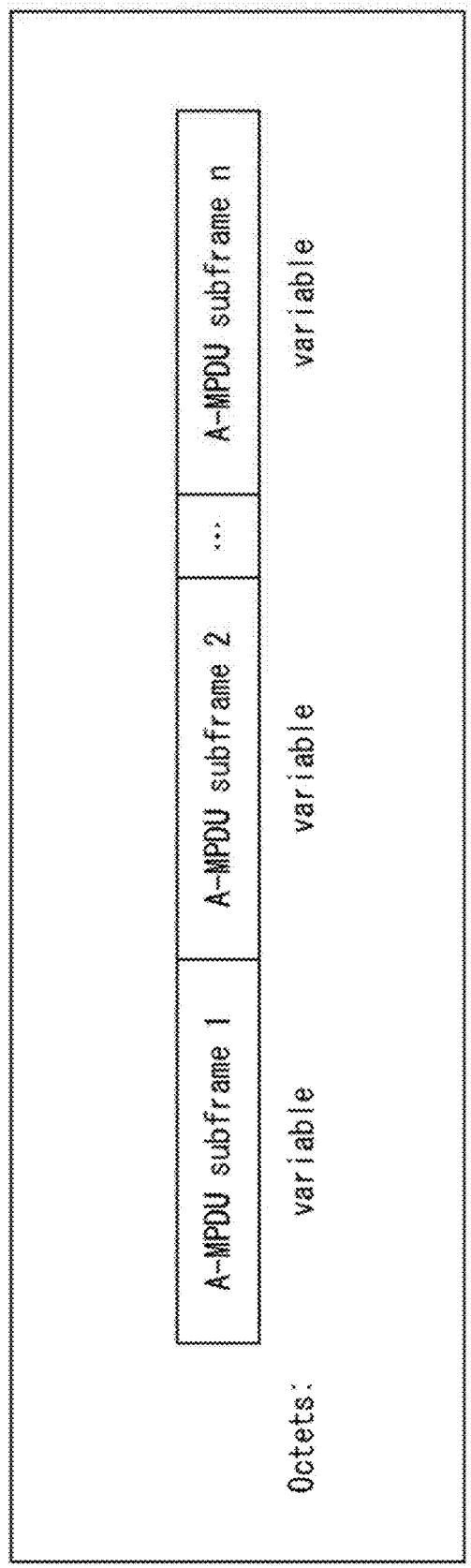
FIG. 19 is a diagram illustrating an example of a configuration of an A-MPDU.

FIG. 19 is a diagram illustrating an example of a configuration of an A-MPDU. An OFDM signal uses a technique of concatenating a plurality of MPDUs into one aggregated MPDU (A-MPDU).

FIG. 19 illustrates a configuration in which an A-MPDU of a subframe 1 to an A-MPDU of a subframe n are aggregated.

Transmitting the plurality of A-MPDU subframes at once in this manner can improve transmission efficiency. However, if the plurality of A-MPDU subframes is just consecutively put together, it is not possible to identify where the boundaries are. Therefore, a delimiter (Delimiter) is added to the head of each MPDU in advance so that each boundary between the MPDUs is identifiable.

Figure 20:
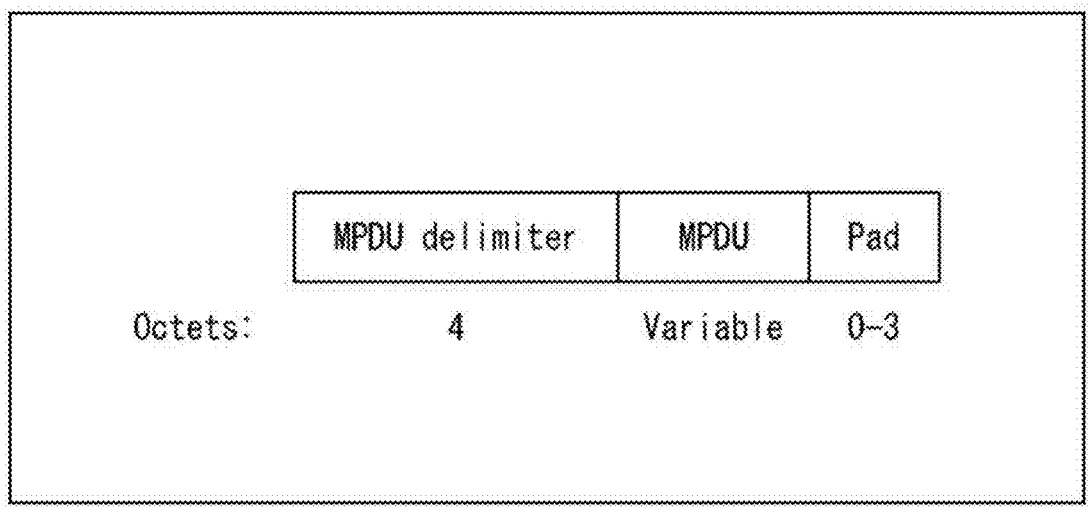
FIG. 20 is a diagram illustrating an example of a detailed configuration of one MPDU.

FIG. 20 is a diagram illustrating an example of a detailed configuration of one MPDU of the A-MPDU.

The MPDU includes an MPDU delimiter (4 Octets), an MPDU (Octets are variable), and a Pad (0 to 3 Octets). As illustrated in FIG. 20, in each MPDU, the delimiter is added to the head of the MPDU.

Figure 21:
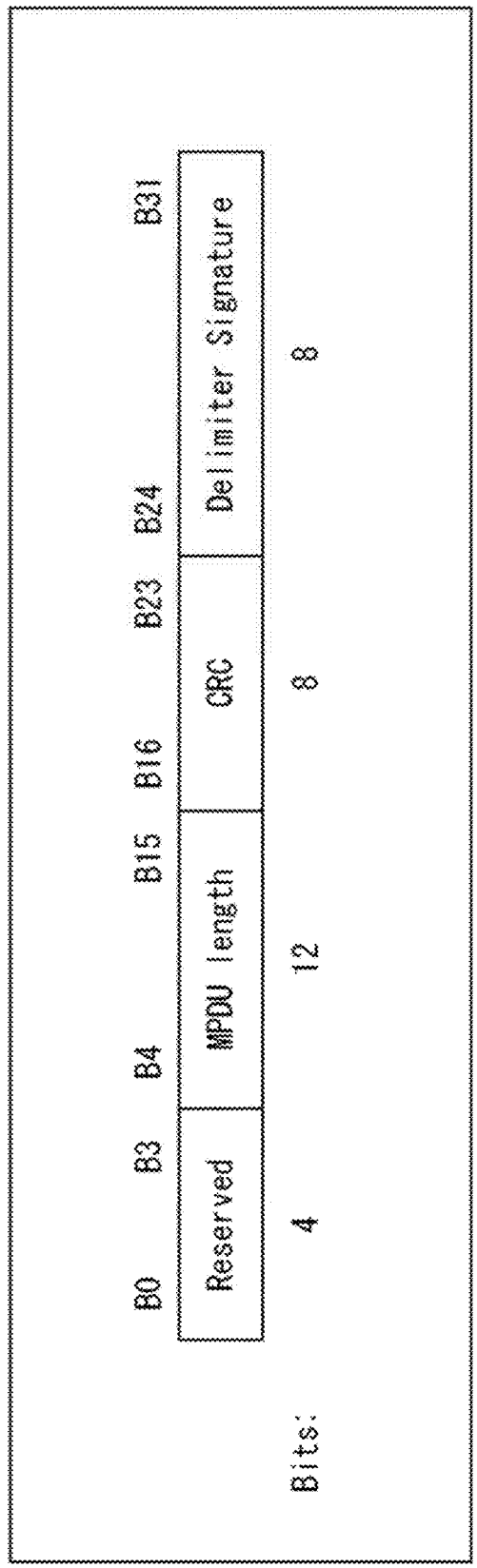
FIG. 21 is a diagram illustrating an example of a configuration of an MPDU delimiter.

FIG. 21 is a diagram illustrating an example of a configuration of the MPDU delimiter.

The MPDU delimiter includes a 4-bit Reserved, a 12-bit MPDU length, a b-bit CRC, and an 8-bit Delimiter Signature.

Here, as a characteristic of the present technology, padding is applied in units of MPDUs so as to fill the Length of the MPDU described in the MPDU delimiter.

Figure 22:
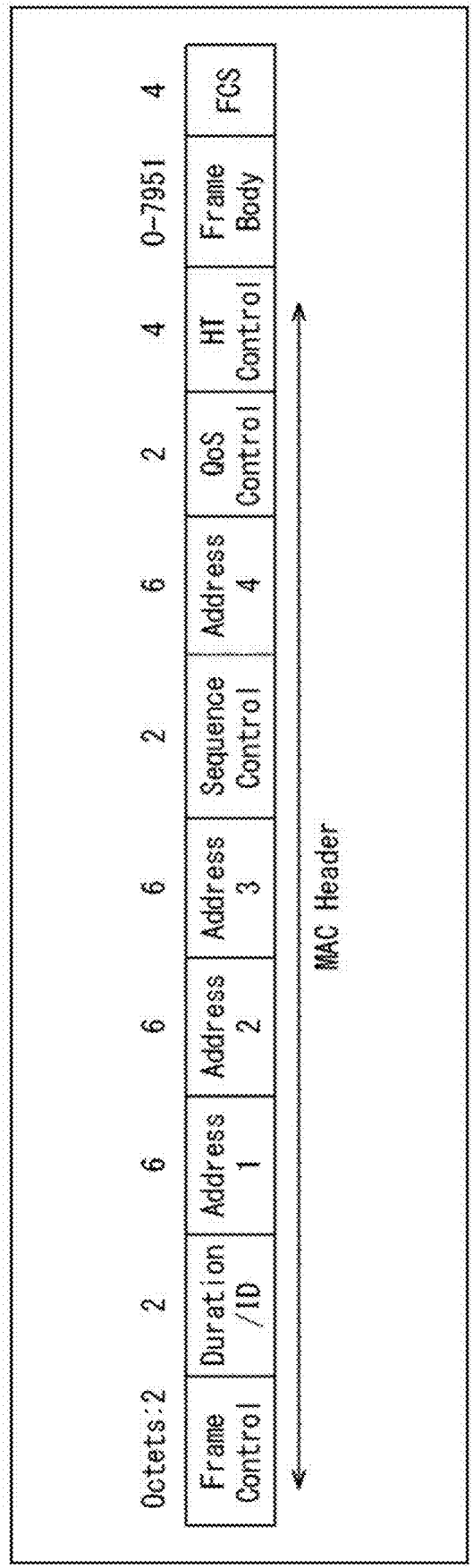
FIG. 22 is a diagram illustrating an example of an internal configuration of the MPDU.

FIG. 22 is a diagram illustrating an example of an internal configuration of the MPDU.

A MAC header, a frame body, and an FCS are included inside the MPDU. In the MAC header portion, source and destination address information and the like are described.

The MAC header in FIG. 22 includes a 2-Octet Frame Control, a 2-Octet Duration ID, a 6-Octet Address 1, a 6-Octet Address 2, a 6-Octet Address 3, a 2-Octet Sequence Control, a 6-Octet Address 4, a 2-Octet QoS Control, a 4-Octet HT control, a 0-7951 Octet Frame body, and a 4-Octet FCS.

To detect errors in the MAC header, the FCS at the end needs to be decoded; otherwise it is not possible to determine whether there is any error. Thus, it takes time to identify which apparatus should return the using signal.

Therefore, a Target Address needs to be specified in the MPDU Header so that the Target Address can be identified without waiting for the FCS at the end. Thus, in the present technology, the MPDU Header is independently configured as illustrated in FIG. 11.

Figure 23:
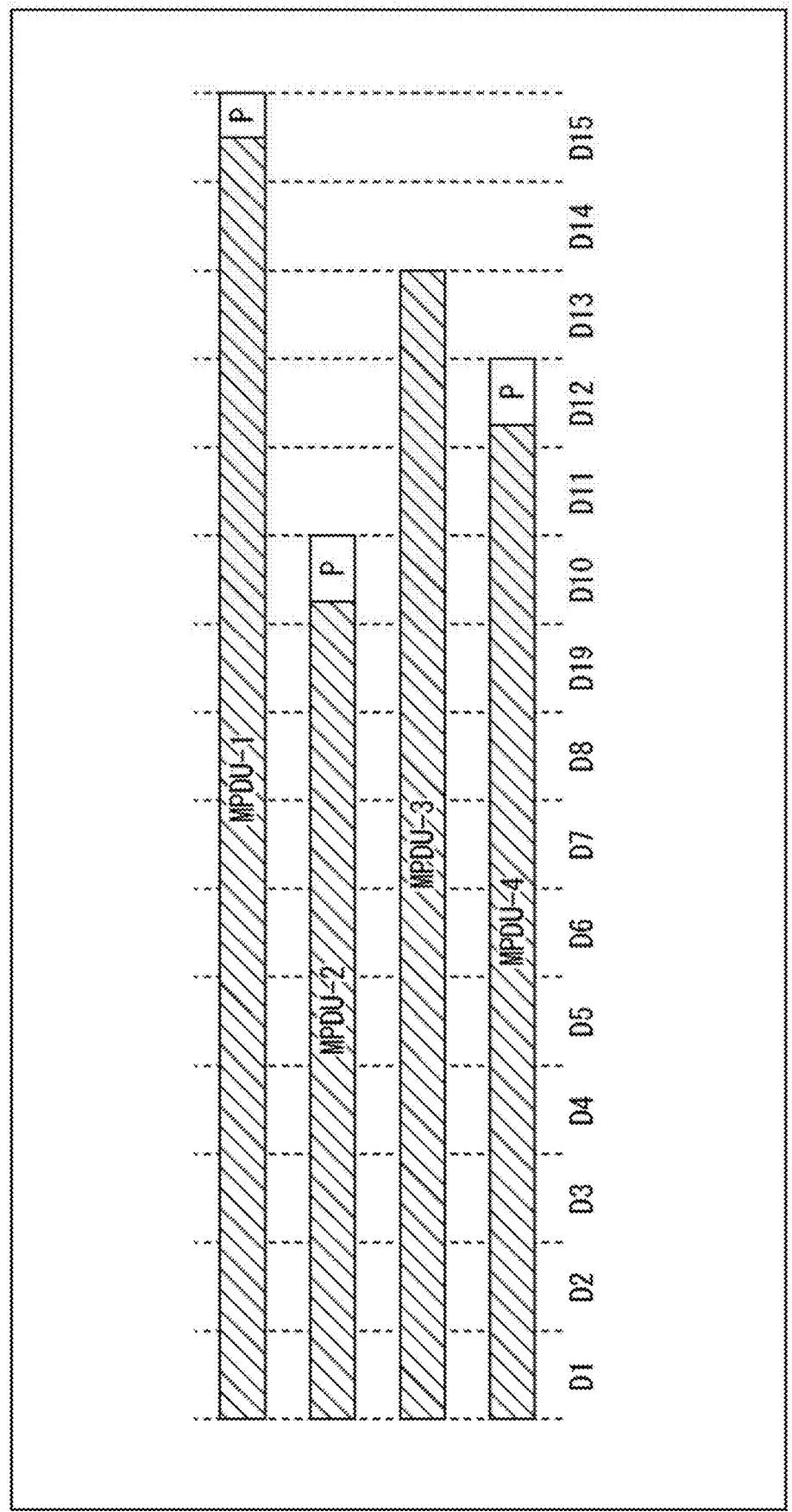
FIG. 23 is a diagram illustrating an example of a configuration of padding.

FIG. 23 is a diagram illustrating an example of a configuration of padding.

In the present technology, the GAP is inserted in units of MPDUs. Therefore, each MPDU needs to be padded until its number becomes divisible by the number of subcarriers (units of 24 bits or 216 bits) of an OFDM symbol.

That is, in a case where the data length of an MPDU to be transmitted is not divisible by one OFDM Symbol, the MPDU is padded. Specifically, in the case of BPSK and R=1/2, padding processing is performed on a portion that cannot be divided by 24 bits.

In the case of the example in FIG. 23, in order from the top, the MPDU-1 has a data length of D15 and the padding processing has been performed thereon. The MPDU-2 has a data length of D10 and the padding processing has been performed thereon. The MPDU-3 has a data length of D13 and the padding processing is not performed thereon. The MPDU-4 has a data length of D12 and the padding processing has been performed thereon.

In the present technology configuring padding and the like as described above, the MPDU header and the GAPs are inserted to form a frame as described above with reference to FIG. 11.

It is noted that OFDM symbols having the time length of the predetermined using signal are set as the GAP. That is, in a case where the L-SIG (4μ seconds) and, moreover, the Using Signal parameter (8μ seconds) according to the present technology are added to the predetermined preamble (8μ seconds×2), the GAP has a duration of 28μ seconds. However, the GAP time may be appropriately adjusted depending on the configuration of the using signal.

<Example of Operation of Communication Apparatus Serving as Transmitting Side>

Next, an example of processing of the communication apparatus 1 serving as the transmitting side will be described with reference to a flowchart in FIG. 24. The communication apparatus 1 serving as the transmitting side corresponds to the transmitting-side apparatus in FIG. 7.

In step S101, the transmission buffer 102 and the network management section 103 acquire, via the interface 101, transmission data from a transmitting application (the equipment control section 13). The network management section 103 manages attribute information such as an address of a communication apparatus included in a BSS that is a surrounding wireless network group overlapping with its own BSS between its own communication apparatus and its surrounding communication apparatus.

In step S102, the network management section 103 acquires the attribute information of the communication apparatus 1 serving as the receiving side on the basis of the transmission data acquired via the interface 101.

In step S103, the network management section 103 determines whether the communication scheme of the communication apparatus 1 serving as the receiving side supports the using signal. In a case where it is determined in step S103 that the using signal is not supported, the process proceeds to step S104.

In step S104, the transmission frame construction section 104 generates a data frame in accordance with an existing communication scheme under the control of the network management section 103.

In a case where it is determined in step S103 that the using signal is supported, the process proceeds to step S105. In step S105, the transmission frame construction section 104 generates a data frame supporting the using signal under the control of the network management section 103. The data frame to be generated may have a configuration in which a plurality of MPDUs is put together, so that the data frame has a predetermined aggregated MPDU configuration.

The generated data frame is supplied to the header information generation section 106 and the wireless transmission processing section 110. On the basis of information supplied from the wireless communication control section 105, the header information generation section 106 generates a predetermined preamble and header information that are to be added to a head portion of the frame supplied from the transmission frame construction section 104. In the header information, information specifying the destination communication apparatus 1, information regarding transmit power of the data frame, and the like are described.

The wireless reception processing section 112 receives a transmission path signal via the antenna 111-1B. In a case where the signal is detected by the detection threshold control section 113, the wireless reception processing section 112 determines whether the signal includes a data frame that has been wirelessly transmitted in the predetermined format from any surrounding communication apparatus 1. In a case where the wireless reception processing section 112 determines that the signal includes a data frame that has been wirelessly transmitted in the predetermined format from any surrounding communication apparatus 1, the wireless reception processing section 112 supplies the received data frame to the header information analysis section 116.

The header information analysis section 116 detects a preamble from the received data frame, analyzes header information, and supplies the result of the analysis to the wireless communication control section 105. Further, in a case where the header information is included, the header information analysis section 116 supplies the header information to the using signal detection section 115. The using signal detection section 115 detects whether the header information includes the using signal.

Here, since the using signal is compatible with the existing preamble, the using signal detection section 115 detects the using signal from the header information supplied from the header information analysis section 116. Alternatively, the using signal detection section 115 may directly detect the using signal from the received data frame.

In a case where the using signal is detected, the using signal detection section 115 supplies information regarding the using signal to the wireless communication control section 105, and recognizes that there is another communication apparatus that is receiving a frame transmitted through the transmission path. Such an access procedure is performed. It is noted that the access procedure is an example and is not limited thereto.

In step S106, after the predetermined access procedure, the wireless communication control section 105 determines whether the data frame can be transmitted through the transmission path on the basis of the result of the analysis analyzed by the header information analysis section 116 and the result of the detection detected by the using signal detection section 115. The wireless communication control section 105 stands by until the data frame is determined to be transmittable through the transmission path in step S106.

In a case where no using signal is detected, in a case where the transmission path is determined to be available in step S106, that is, the data frame is determined to be transmittable through the transmission path, the process proceeds to step S107. In step S107, the wireless communication control section 105 controls the header information generation section 106 to cause the header information generation section 106 to transmit the data frame.

The header information generation section 106 adds the generated header information to the data frame generated by the transmission frame construction section 104 and supplies the data frame to the wireless transmission processing section 110. The wireless transmission processing section 110 converts the data frame to which the header information generated by the header information generation section 106 is added into a predetermined baseband signal, performs the modulation processing and signal processing on the baseband signal, and transmits, via the antenna 111-1A, the baseband signal having undergone the signal processing.

At this time, the frame may be transmitted, under the control of the transmit power control section 109, with a minimum transmit power with which the communication apparatus 1 serving as the receiving side can receive the frame. Further, the frame may be transmitted with a transmit power value that does not affect the communication by the OBSS. This transmit power value is calculated on the basis of the reception electric field strength at the time of the reception of the using signal and information regarding the reception electric field strength described in the using signal.

In step S108, the wireless communication control section 105 determines whether this is the position where the using signal is arranged. In a case where it is determined that this is not the position where the using signal is arranged, the process returns to step S107 and repeats the subsequent processes.

In a case where it is determined in step S108 that this is the position where the using signal is arranged, the process proceeds to step S109. In step S109, the transmission timing control section 108 inserts the GAP under the control of the wireless communication control section 105.

It is noted that the GAP insertion method is not limited to the control of the transmission timing. Another conceivable method is, for example, to input empty data in the GAP portion when a data frame is created, so that no signal is output only during the GAP portion.

In step S110, the wireless communication control section 105 determines whether the using signal has been detected on the basis of the result of detection received from the using signal detection section 115 after the above-described predetermined access procedure is performed. In a case where it is determined in step S110 that the using signal has been detected, the process proceeds to step S111.

In step S111, the wireless communication control section 105 acquires parameters described in the using signal detected by the using signal detection section 115. At this time, the wireless communication control section 105 may monitor the state of the transmission path where necessary.

After that, the process proceeds to step S114.

On the other hand, in a case where it is determined in step S110 that the using signal has not been detected, the process proceeds to step S112. In step S112, the wireless communication control section 105 performs the predetermined access procedure to determine whether the using signal has been undetected in succession.

In a case where it is determined in step S112 that the using signal has been undetected in succession, the process proceeds to step S113. In step S113, the wireless communication control section 105 determines whether to perform retransmission. In a case where retransmission is determined not to be performed, the processing of the communication apparatus 1 serving as the transmitting side ends.

In a case where retransmission is determined to be performed in step S113, the process returns to step S106 and repeats the subsequent processes. In a case where it is determined in step S112 that the using signal has not been undetected in succession, the process proceeds to step S114.

In step S114, the wireless communication control section 105 determines whether this is the end of the data frame. In a case where it is determined in step S114 that this is not the end of the data frame, the process returns to step S107 and repeats the subsequent processes.

In a case where it is determined in step S114 that this is the end of the data frame, the processing of the communication apparatus 1 serving as the transmitting side ends. After that, as in the conventional case, the communication apparatus 1 serving as the transmitting side may be caused to exchange ACK frames to check whether the data frame has been received.

It is noted that in a case where the communication scheme does not support the using signal, the processes related to the using signal in steps S108 to S111 are skipped.

<Example of Operation of Communication Apparatus Serving as Receiving Side>

Next, an example of processing of the communication apparatus 1 serving as the receiving side will be described with reference to a flowchart in FIG. 25. The communication apparatus 1 serving as the receiving side corresponds to the receiving-side apparatus in FIG. 7.

The access procedure described above with reference to FIG. 24 is performed. In step S151, the wireless communication control section 105 determines whether the header information analysis section 116 has detected a preamble and stands by until it is determined that the preamble has been detected. In a case where it is determined in step S151 that the preamble has been detected, the process proceeds to step S152.

In step S152, the wireless communication control section 105 acquires PLCP header information analyzed by the header information analysis section 116, and in a case where the data frame supports the using signal, the wireless communication control section 105 stores that the data frame supports the using signal.

In step S153, the wireless communication control section 105 acquires, from the detection threshold control section 113, the reception electric field strength at the time of reception of the using signal.

In step S154, the reception data construction section 117 receives a data payload (or an MPDU-0 header) and performs decoding until the end of the MPDU.

In step S155, the reception data construction section 117 determines whether decoding has been successfully performed until the end of the MPDU without error. In a case where it is determined in step S155 that decoding has been successfully performed without error, the process proceeds to step S156. In step S156, the reception data construction section 117 acquires the data payload and accumulates the data payload in the reception buffer 118.

In step S157, the reception data construction section 117 generates ACK information to the received data frame. The generated ACK information may be included in the using signal or may be transmitted as a block ACK frame at the end of the transmission.

In a case where it is determined in step S155 that decoding has not been successfully performed without error until the end of the MPDU, the process skips the processes in steps S156 and S157 and proceeds to step S158.

In step S158, the transmission timing control section 108 determines whether this is the position for the using signal. In step S159, the transmission timing control section 108 acquires the using signal generated by the using signal generation section 107. In step S160, the wireless transmission processing section 110 transmits the using signal supplied from the transmission timing control section 108.

Here, the transmit power control section 109 transmits a normal data frame with a minimum power with which the communication apparatus 1 serving as the receiving side can receive the normal data frame. By contrast, the transmit power control section 109 performs control so as to transmit the using signal with a transmit power larger than that of the normal data frame.

In step S161, the wireless communication control section 105 determines whether the end of the data frame has arrived. For example, in a case where the aggregated MPDU continues, it is determined in step S161 that the end of the data frame has not arrived. Thus, the process returns to step S154 and repeats the subsequent processes. In a case where it is determined in step S161 that the end of the data frame has arrived, the processing of the communication apparatus 1 serving as the receiving side ends.

<Example of Operation of Surrounding Communication Apparatus>

Next, an example of processing of the surrounding communication apparatus 1 will be described with reference to a flowchart illustrated in FIG. 26. The surrounding communication apparatus 1 corresponds to at least one of the receiving-side-vicinity surrounding apparatus, the transmitting-and-receiving-side-vicinity surrounding apparatus, the receiving-side-distant surrounding apparatus, the SR transmitting-side apparatus, or the SR receiving-side apparatus in FIG. 7.

The above-described access procedure is performed. In step S201, the wireless communication control section 105 stands by until it is determined that the using signal has been detected by the using signal detection section 115. In a case where it is determined in step S201 that the using signal has been detected, the process proceeds to step S202.

In step S202, the wireless communication control section 105 acquires parameters described in the using signal detected by the using signal detection section 115. In step S203, the wireless communication control section 105 determines whether the detected using signal is a signal of an OBSS with reference to the acquired parameters such as, for example, BSS Color information.

In a case where it is determined in step S203 that the detected using signal is not a signal of an OBSS, the signal is a signal of the BSS. Thus, the processing of the surrounding communication apparatus 1 ends.

In a case where it is determined in step S203 that the detected using signal is a signal of an OBSS, the process proceeds to step S204. In step S204, the wireless communication control section 105 determines whether the detected using signal supports spatial reuse with reference to the acquired parameters.

In a case where it is determined in step S204 that the spatial reuse is supported, the process proceeds to step S205. In step S205, the wireless communication control section 105 calculates, on the basis of the reception electric field strength at the time of the reception of the using signal and information regarding the reception electric field strength described in the using signal, a transmit power value that does not affect the communication by the OBSS.

In step S206, the wireless communication control section 105 refers to information and the like managed by the network management section 103 and determines whether there is any schedule to transmit a data frame in its own BSS. In a case where it is determined in step S206 that there is no schedule to transmit a data frame in the BSS, the processing of the surrounding communication apparatus 1 ends.

In a case where it is determined in step S206 that there is a schedule to transmit a data frame in the BSS, the process proceeds to step S207.

In step S207, the wireless communication control section 105 sets a backoff time to wait for transmission. In step S208, the wireless communication control section 105 determines that the set backoff time has expired and stands by until it is determined that the set backoff time has expired. In a case where it is determined in step S208 that the set backoff time has expired, the process proceeds to step S209.

In step S209, the transmit power control section 109 sets the transmit power calculated by the wireless communication control section 105.

In step S210, the wireless transmission processing section 110 transmits a data frame to which header information generated by the header information generation section 106 is added (or a data frame generated by the transmission frame construction section 104).

Figure 24:
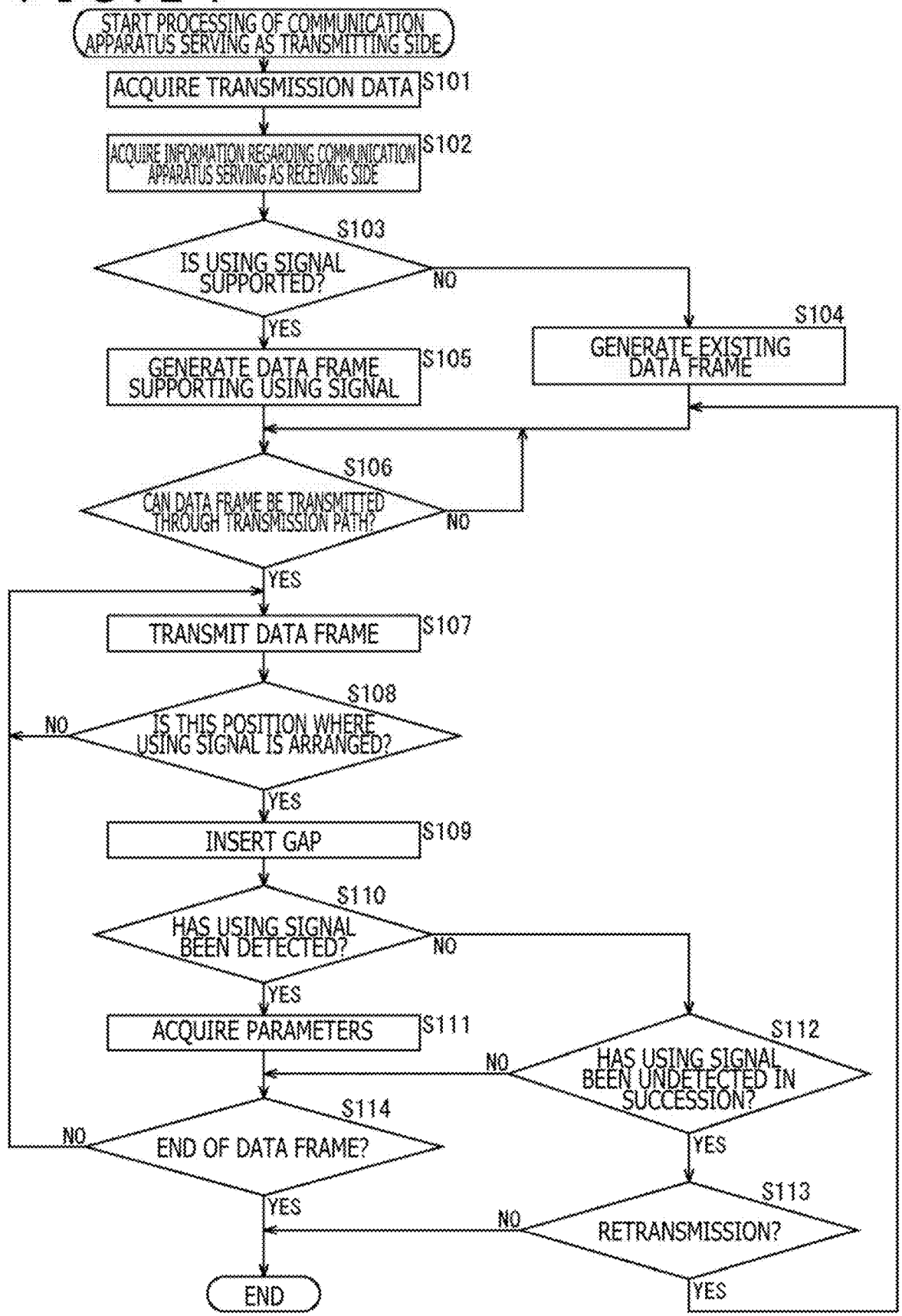
FIG. 24 is a flowchart for describing an example of processing of a communication apparatus serving as a transmitting side.
Figure 25:
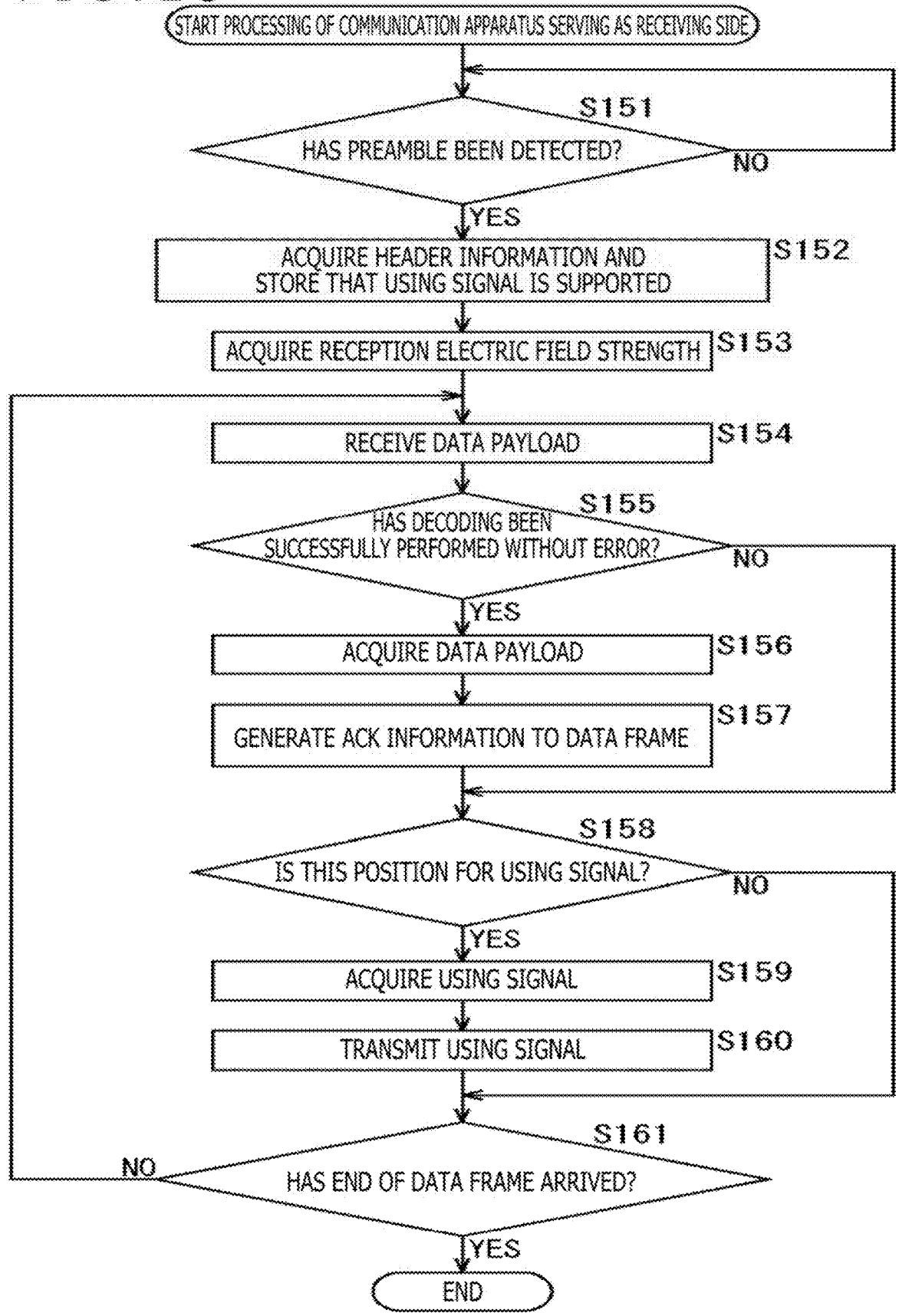
FIG. 25 is a flowchart for describing an example of processing of a communication apparatus serving as a receiving side.
Figure 26:
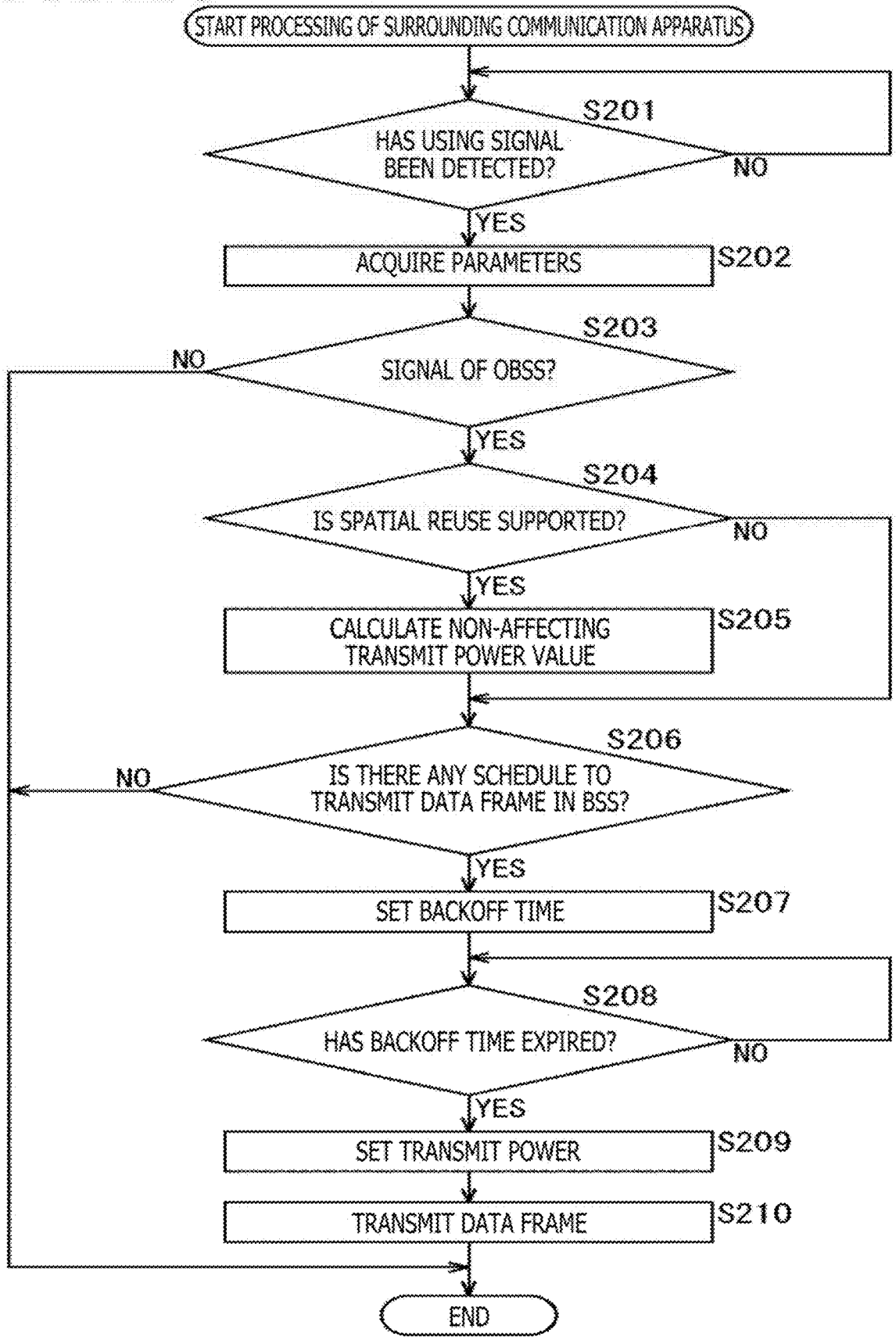
FIG. 26 is a flowchart for describing an example of processing of a surrounding communication apparatus.

It is noted that while the processes of the communication apparatus 1 serving as the transmitting side, the communication apparatus 1 serving as the receiving side, and the surrounding communication apparatus 1 are separately described in FIGS. 24 to 26, the communication apparatus 1 can perform any of the processes. Each step used in the three processes may be used in any of the processes where necessary. The order of the steps may also be changed.

In this manner, in the present technology, the using signal is intermittently transmitted from a data frame receiving side. Therefore, apparatuses within interference ranges that affect the reception can be notified.

For example, an aggregated A-MPDU frame secures the area of the using signal after an MPDU subframe. With this configuration, surrounding apparatuses can be notified in a short cycle that there is an apparatus receiving a data frame.

Conventionally, with a method of using a busy tone to give a notification that the transmission path is in use, a channel and the like for transmitting a busy tone signal has been needed and therefore a communication block for transmitting and receiving the busy tone signal has been needed.

By contrast, according to the present technology, the using signal is used. Thus, processing can be performed using a conventional transmission/reception circuit as it is and does not need a tone signal transmission/reception circuit or filter.

In a case where the NAV is set through exchange of conventional RTS/CTS frames, although there is no effect on reception of a data frame by the communication apparatus 1 serving as the receiving side, the NAV is set in the surrounding communication apparatus 1 that has been able to receive an RTS frame but not a CTS frame. This has reduced transmission opportunities of the surrounding communication apparatus 1.

With the NAV setting method according to the conventional technology, the NAV is set in both of the cases where an RTS signal is received and where a CTS signal is received. This method, therefore, has suppressed transmission from a range that does not affect reception of the data frame by the communication apparatus 1 serving as the receiving side.

That is, it has been considered that if no CTS signal is received after the NAV is set by the RTS signal, the effect of interference to the communication apparatus 1 that is the destination of the signal is small.

By contrast, according to the present technology, it is possible to cause the surroundings of the communication apparatus 1 serving as the receiving side to set the network allocation vector (NAV) without exchanging the RTS/CTS.

Further, there have been cases where if an overlapping BSS in the surroundings of the communication apparatus 1 serving as the receiving side transmits a signal with a maximum transmit power without performing transmit power control in a case where a signal is being received with a reduced transmit power under transmit power control, communication in a BSS cannot be performed.

That is, there have been cases where even if transmit power control is performed and communication is performed with a suppressed transmit power in the BSS, the overlapping BSS (OBSS) that does not recognize that the transmit power control is being performed transmits a signal without performing transmit power control.

According to the present technology, RSSI information at the time of the reception of data and data transmit power information are described in the using signal. With this configuration, it is possible to estimate a required S/N ratio of the data destination from the RSSI information and the value of the transmit power information, and determine whether transmission can be performed using spatial reuse. Accordingly, a transmit power that does not affect the data reception can be set.

The present technology can be applied to communication apparatuses such as access points and communication devices included in a wireless LAN system.

<Example of Hardware Configuration of Communication Apparatus>

The series of processes described above can be performed by hardware or software. In a case where the series of processes is performed by software, a program constituting the software is installed in a computer. Here, the computer includes a computer incorporated in dedicated hardware, a general-purpose personal computer, for example, capable of executing various kinds of functions with various kinds of programs installed therein, and the like.

Figure 27:
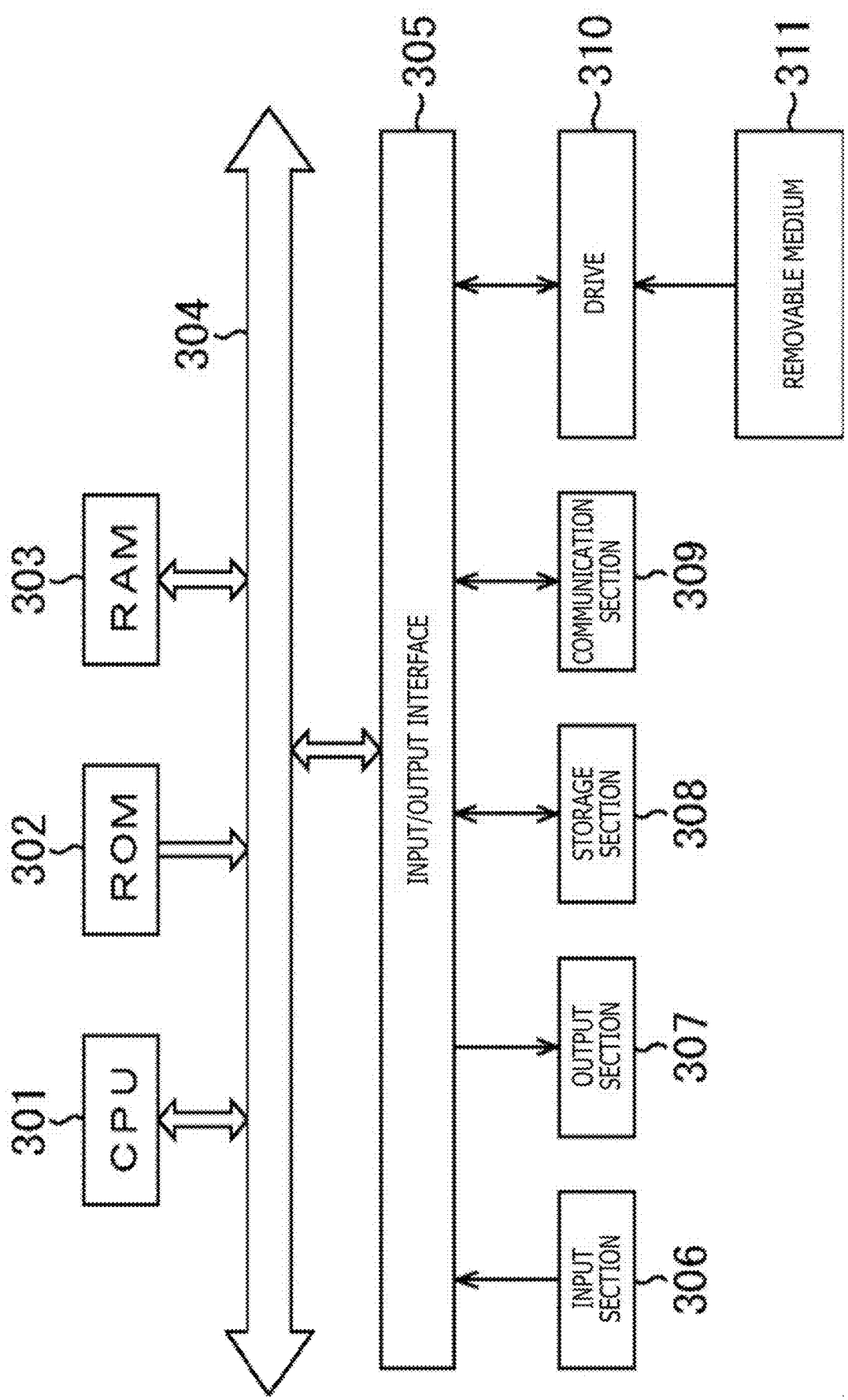
FIG. 27 is a diagram illustrating an example of a hardware configuration of a communication apparatus.

FIG. 27 is a block diagram illustrating an example of a hardware configuration of a communication apparatus that performs the above-described series of processes using a program.

In a communication apparatus 300 illustrated in FIG. 27, a CPU (Central Processing Unit) 301, a ROM (Read Only Memory) 302, and a RAM (Random Access Memory) 303 are connected to each other via a bus 304.

Further, an input/output interface 305 is also connected to the bus 304. An input section 306, an output section 307, a storage section 308, a communication section 309, and a drive 310 are connected to the input/output interface 305.

The input section 306 includes, for example, a keyboard, a mouse, a microphone, a touch panel, an input terminal, and the like. The output section 307 includes, for example, a display, a speaker, an output terminal, and the like. The storage section 308 includes, for example, a hard disk, a RAM disk, a nonvolatile memory, and the like. The communication section 309 includes, for example, a network interface. The drive 310 drives a removable medium 311 such as a magnetic disk, an optical disc, a magneto-optical disk, or a semiconductor memory.

In the communication apparatus configured as above, the CPU 301 performs the above-described series of processes by loading the program, which is stored in the storage section 308, into the RAM 303 via the input/output interface 305 and the bus 304 and executing the program, for example. Data and the like necessary for the CPU 301 to perform various kinds of processes are also appropriately stored in the RAM 303.

The program to be executed by the communication apparatus (the CPU 301) can be recorded on the removable medium 311 as a package medium or the like and applied, for example. In this case, the removable medium 311 is attached to the drive 310 so that the program can be installed in the storage section 308 via the input/output interface 305.

Further, this program can also be provided via a wired or wireless transmission medium such as a local area network, the Internet, or digital satellite broadcasting. In this case, the program can be received by the communication section 309 and installed in the storage section 308.

Alternatively, this program can be installed in the ROM 302 or the storage section 308 in advance.

It is noted that the program to be executed by the communication apparatus may be a program that performs processes in chronological order in the order described in the present specification or a program that performs processes in parallel or at necessary timings on occasions of calls or the like.

It is noted that in the present specification, a system refers to a collection of a plurality of constituent elements (apparatuses, modules (components), and the like), and it does not matter whether or not all the constituent elements are within the same housing. Therefore, a plurality of apparatuses stored in separate housings and connected via a network, and one apparatus storing a plurality of modules in one housing are, in either case, the system.

Further, the effects described in the present specification are merely examples and are not limited. Further, there may be additional effects.

The embodiment of the present technology is not limited to the above-described embodiment, and various modifications can be made without departing from the scope of the present technology.

For example, the present technology can be configured as cloud computing in which one function is shared and processed collaboratively among a plurality of apparatuses via a network.

Further, each step described in the above-described flowcharts can be performed by a single apparatus or can be shared and performed by a plurality of apparatuses.

Moreover, in a case where one step includes a plurality of processes, the plurality of processes included in this one step can be performed not only by one apparatus but also by a plurality of apparatuses in a shared manner.

Although the preferred embodiment of the present disclosure has been described above in detail with reference to the accompanying drawings, the present disclosure is not limited to the above example. It is apparent that a person having ordinary knowledge in the technical field of the present disclosure can conceive of various kinds of alterations or modifications within the scope of the technical ideas described in the claims, and it is to be understood that such alterations or modifications also naturally fall within the technical scope of the present disclosure.

It is noted that the present technology can also have the following configurations.

(1)

A communication apparatus including:

a construction section configured to generate a data frame;

a transmission section configured to transmit the data frame to a destination communication apparatus; and a control section configured to, during the transmission of the data frame, perform control to suspend the transmission for a predetermined period of time.

(2)

The communication apparatus according to (1), further including:

a reception section configured to receive a using signal from the destination communication apparatus during the predetermined period of time in which the transmission is suspended, the using signal indicating that a transmission path is in use.

(3)

The communication apparatus according to (1) or (2), in which the predetermined period of time in which the transmission is suspended includes a switching time between a transmission operation and a reception operation.

(4)

The communication apparatus according to any one of (1) to (3), in which the transmission section transmits the data frame with a transmit power with which the destination communication apparatus is able to receive the data frame.

(5)

The communication apparatus according to any one of (1) to (4), further including:

a header information generation section configured to generate header information of the data frame in which information regarding a transmit power of the data frame and information specifying the destination communication apparatus to which the data frame is transmitted are described.

(6)

The communication apparatus according to any one of (1) to (5), further including:

a transmit power control section configured to, on the basis of a reception electric field strength at a time of the reception of the using signal and information regarding a reception electric field strength described in the using signal, set a transmit power that does not affect reception of a data frame by another communication apparatus, in which the transmission section transmits the data frame with the transmit power.

(7)

The communication apparatus according to any one of (1) to (5), in which in a case where the control section has not detected a using signal from another communication apparatus for a predetermined time, the control section determines that the transmission path is available, and in a case where the transmission path is determined to be available, the transmission section transmits the data frame to the destination communication apparatus.

(8)

A communication apparatus including:

a reception section configured to receive a data frame transmitted so as to include intermittent transmission-suspension periods; and a transmission section configured to transmit a using signal during each of the transmission-suspension periods, the using signal indicating that a transmission path is in use.

(9)

The communication apparatus according to (8), further including:

a using signal generation section configured to add a reception duration to the using signal, the reception duration being calculated on the basis of a parameter added to the data frame in which a duration of the data frame is described.

(10)

The communication apparatus according to (9), in which the using signal generation section adds, to the using signal, information regarding a reception electric field strength at a time of the reception of the data frame and information regarding a transmit power added to header information of the data frame.

(11)

The communication apparatus according to any one of (8) to (10), in which when the reception of the data frame ends, the transmission section transmits an end signal indicating that the reception of the data frame has ended.

(12)

The communication apparatus according to any one of (8) to (11), in which the transmission section transmits the using signal with a transmit power that is larger than a transmit power of the data frame of a source communication apparatus that has transmitted the data frame.

(13)

The communication apparatus according to any one of (8) to (11), in which the using signal includes information for identifying a network and information specifying a source communication apparatus that has transmitted the data frame.

(14)

The communication apparatus according to any one of (8) to (13), in which a parameter arrangement of the using signal is compatible with a parameter arrangement of a preamble according to an existing scheme.

(15)

A communication apparatus including:

a reception section configured to receive a using signal transmitted to a first communication apparatus from a second communication apparatus, the using signal indicating that a transmission path is in use, the first communication apparatus being configured to transmit a data frame transmitted so as to include intermittent transmission-suspension periods, the second communication apparatus being configured to receive the data frame, the using signal being transmitted during each of the transmission-suspension periods; and a transmission control section configured to control transmission according to a reception status of the using signal.

(16)

The communication apparatus according to (15), in which in a case where the using signal has been received, the transmission control section performs the control so as to prohibit the transmission.

(17)

The communication apparatus according to (15) or (16), in which in a case where the reception section has not received the using signal, the transmission control section controls transmission of another data frame.

(18)

The communication apparatus according to any one of (15) to (17), further including:

a transmit power control section configured to, on the basis of a reception electric field strength at a time of the reception of the using signal and a reception electric field strength described in the using signal, set a transmit power that does not affect the reception of the data frame by the second communication apparatus, in which the transmission control section controls the transmission of the another data frame with the transmit power.

(19)

The communication apparatus according to (18), in which the transmission control section sets a backoff time including a transmission waiting time, and when the backoff time has expired, the transmission control section controls the transmission of the another data frame with the transmit power.

REFERENCE SIGNS LIST 1, 1-1 to 1-5 Communication apparatus, 11 Internet connection module, 12 Information input module, 13 Equipment control section, 14 Information output module, 15 Wireless communication module, 101 Interface, 102 Transmission buffer, 103 Network management section, 104 Transmission frame construction section, 105 Wireless communication control section, 106 Header information generation section, 107 Using signal generation section, 108 Transmission timing control section, 109 Transmit power control section, 110 Wireless transmission processing section, 111 Antenna control section, 111-1A Antenna, 111-1B Antenna, 112 Wireless reception processing section, 113 Detection threshold control section, 114 Reception timing control section, 115 Using signal detection section, 116 Header information analysis section, 117 Reception data construction section, 118 Reception buffer

The invention claimed is:

1. A communication apparatus, comprising:
a construction section configured to generate a data frame;
a transmission section configured to transmit the data frame to a destination communication apparatus;
a control section configured to, during the transmission of the data frame, perform control to suspend the transmission for a specific period of time; and
a reception section configured to receive a using signal from the destination communication apparatus during the specific period of time, wherein the using signal indicates that a transmission path is in use.

2. The communication apparatus according to claim 1, wherein the specific period of time includes a switching time between a transmission operation and a reception operation associated with the communication apparatus and the destination communication apparatus.

3. The communication apparatus according to claim 1, wherein the transmission section is further configured to transmit the data frame with a transmit power with which the destination communication apparatus is able to receive the data frame.

4. The communication apparatus according to claim 1, further comprising a header information generation section configured to generate header information of the data frame, wherein the header information includes information regarding a transmit power of the data frame and information that specifies the destination communication apparatus.

5. The communication apparatus according to claim 1, further comprising:

a transmit power control section configured to, based on a reception electric field strength at a time of the reception of the using signal and information regarding a reception electric field strength described in the using signal, set a transmit power that does not affect reception of a data frame by the destination communication apparatus, wherein the transmission section is further configured to transmit the data frame with the set transmit power.

6. The communication apparatus according to claim 1, wherein in a case where the control section has not detected the using signal from the destination communication apparatus for the specific period of time, the control section is further configured to determine that the transmission path is available, and in a case where the transmission path is determined to be available, the transmission section is further configured to transmit the data frame to the destination communication apparatus.

7. A communication apparatus, comprising:

a reception section configured to receive a data frame to include intermittent transmission-suspension periods; and a transmission section configured to transmit a using signal in a suspension period during each of the intermittent transmission-suspension periods, wherein the using signal indicates that a transmission path is in use.

8. The communication apparatus according to claim 7, further comprising a using signal generation section configured to add a reception duration to the using signal, wherein the reception duration is calculated based on addition of a parameter to the data frame, and the parameter includes a duration of the data frame.

9. The communication apparatus according to claim 8, wherein the using signal generation section is further configured to add, to the using signal, information regarding a reception electric field strength at a time of the reception of the data frame and information regarding a transmit power added to header information of the data frame.

10. The communication apparatus according to claim 7, wherein based on an end of the reception of the data frame, the transmission section is further configured to transmit an end signal that indicates the end of the reception of the data frame.

11. The communication apparatus according to claim 7, wherein the transmission section is further configured to transmit the using signal with a transmit power larger than a transmit power of the data frame of a source communication apparatus that has transmitted the data frame.

12. The communication apparatus according to claim 7, wherein the using signal includes information to identify a network and information to specify a source communication apparatus that has transmitted the data frame.

13. The communication apparatus according to claim 7, wherein the using signal is compatible with a preamble based on an existing scheme.

14. A communication apparatus, comprising:

a reception section configured to receive a using signal transmitted to a first communication apparatus from a second communication apparatus, wherein the using signal indicates that a transmission path is in use, the first communication apparatus is configured to transmit a first data frame to include intermittent transmission-suspension periods, the second communication apparatus is configured to:
receive the first data frame; and
transmit the using signal in a suspension period in each of the intermittent transmission-suspension periods; and a transmission control section configured to control transmission based on a reception status of the using signal.

15. The communication apparatus according to claim 14, wherein, the transmission control section is further configured to prohibit the transmission based on the reception of the using signal.

16. The communication apparatus according to claim 14, wherein in a case where the reception section has not received the using signal, the transmission control section is further configured to control transmission of a second data frame.

17. The communication apparatus according to claim 16, further comprising:

a transmit power control section configured to, based on a reception electric field strength at a time of the reception of the using signal and a reception electric field strength described in the using signal, set a transmit power that does not affect the reception of the second data frame by the second communication apparatus, wherein the transmission control section is further configured to control the transmission of the second data frame with the set transmit power.

18. The communication apparatus according to claim 17, wherein the transmission control section is further configured to set a backoff time that includes a transmission waiting time, and the transmission control section is further configured to control the transmission of the second data frame with the transmit power based on expiration of the backoff time.

* * * * *